(12) United States Patent
Oh et al.

(10) Patent No.: US 10,694,870 B2
(45) Date of Patent: Jun. 30, 2020

(54) REFRIGERATOR

(71) Applicant: LG ELECTRONICS INC., Seoul (KR)

(72) Inventors: Changseok Oh, Seoul (KR); Sangmyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/695,611

(22) Filed: Nov. 26, 2019

(65) Prior Publication Data

US 2020/0093284 A1 Mar. 26, 2020

Related U.S. Application Data

(63) Continuation of application No. 15/963,498, filed on Apr. 26, 2018, now Pat. No. 10,524,586.

(30) Foreign Application Priority Data

Apr. 26, 2017 (KR) .................. 10-2017-0053880

(51) Int. Cl.
*A47F 3/04* (2006.01)
*E05D 11/00* (2006.01)
(Continued)

(52) U.S. Cl.
CPC ........ *A47F 3/0434* (2013.01); *E05D 11/0081* (2013.01); *F25D 23/028* (2013.01);
(Continued)

(58) Field of Classification Search
CPC ............... A47F 3/0434; E05D 11/0081; E05Y 2900/31; G02F 2203/01; G02F 1/13338;
(Continued)

(56) References Cited

U.S. PATENT DOCUMENTS

2005/0284159 A1  12/2005  Kim
2006/0064846 A1  3/2006  Espindola et al.
(Continued)

FOREIGN PATENT DOCUMENTS

KR  10-2004-0049690  6/2004
KR  10-2005-0085076  8/2005
(Continued)

OTHER PUBLICATIONS

International Search Report dated Jul. 10, 2018 issued in Application No. PCT/KR2018/003322.
(Continued)

*Primary Examiner* — Hanh V Tran
(74) *Attorney, Agent, or Firm* — KED & Associates LLP

(57) ABSTRACT

A refrigerator includes a cabinet, a control unit provided in the cabinet and controlling an operation of the refrigerator, a main door that opens or closes the cabinet and has an opening formed therein, a main hinge that couples the cabinet to the main door and allows the main door to be pivotably mounted, a sub-door that is formed on a front surface of the refrigerator and opens or closes the opening, a sub-hinge that couples the main door to the sub-door and allows the sub-door to be pivotably mounted, a sub-hinge cover that simultaneously shield a main hinge shaft of the main hinge and a sub-hinge shaft of the sub-hinge, and a wire disposed to extend from an inside of the sub-door, to be connected with the control unit, and to sequentially pass through the sub-hinge shaft and the main hinge shaft along an inside of the sub-hinge cover.

20 Claims, 32 Drawing Sheets

(51) Int. Cl.
*F25D 23/02* (2006.01)
*G06F 3/041* (2006.01)
*G06F 3/16* (2006.01)
*G02F 1/1333* (2006.01)

(52) U.S. Cl.
CPC ..... *E05Y 2900/31* (2013.01); *F25D 2323/021* (2013.01); *F25D 2323/023* (2013.01); *F25D 2323/024* (2013.01); *F25D 2400/40* (2013.01); *G02F 1/13338* (2013.01); *G02F 2201/503* (2013.01); *G02F 2203/01* (2013.01); *G06F 3/041* (2013.01); *G06F 3/167* (2013.01); *G06F 2203/04103* (2013.01)

(58) Field of Classification Search
CPC ..... G02F 2201/503; G06F 2203/04103; G06F 3/041; G06F 3/167; F25D 2323/021; F25D 23/028; F25D 2323/024; F25D 2400/40; F25D 2323/023
See application file for complete search history.

(56) References Cited

U.S. PATENT DOCUMENTS

| | | | |
|---|---|---|---|
| 2007/0204648 | A1 | 9/2007 | Smale et al. |
| 2012/0260683 | A1 | 10/2012 | Cheon et al. |
| 2014/0139091 | A1 | 5/2014 | Oh et al. |
| 2015/0260443 | A1 | 9/2015 | Lee et al. |
| 2015/0260447 | A1 | 9/2015 | Kim et al. |
| 2016/0033194 | A1 | 2/2016 | Sumihiro et al. |
| 2016/0084560 | A1 | 3/2016 | Jeong et al. |
| 2016/0117022 | A1 | 4/2016 | Kim et al. |
| 2016/0123055 | A1 | 5/2016 | Ueyama |
| 2016/0123657 | A1 | 5/2016 | Kim et al. |
| 2016/0201975 | A1 | 7/2016 | Bazzucchi |
| 2017/0188721 | A1 | 7/2017 | Park et al. |
| 2017/0350644 | A1 | 12/2017 | Xia et al. |
| 2018/0149420 | A1 | 5/2018 | Lee et al. |
| 2018/0187952 | A1 | 7/2018 | Lv et al. |
| 2018/0187956 | A1 | 7/2018 | Kim et al. |
| 2018/0252463 | A1 | 9/2018 | Grimminger et al. |
| 2018/0266751 | A1 | 9/2018 | Lim et al. |
| 2018/0328641 | A1 | 11/2018 | Lee et al. |
| 2018/0372394 | A1 | 12/2018 | Kim et al. |
| 2019/0024962 | A1 | 1/2019 | Lee et al. |
| 2019/0032994 | A1 | 1/2019 | Choi |
| 2019/0086141 | A1 | 3/2019 | Kim et al. |

FOREIGN PATENT DOCUMENTS

| | | |
|---|---|---|
| KR | 10-2013-0072186 | 7/2013 |
| KR | 10-2015-0106279 | 9/2015 |
| KR | 10-2016-0022877 | 3/2016 |
| WO | WO 2011/081279 | 7/2011 |
| WO | WO 2014/175639 | 10/2014 |
| WO | WO 2016/064182 | 4/2016 |
| WO | WO 2016/175562 | 11/2016 |

OTHER PUBLICATIONS

European Search Report dated Jan. 9, 2019 issued in Application No. 18165169.6.
United States Office Action dated May 8, 2019 issued in co-pending U.S. Appl. No. 15/963,498.
United States Notice of Allowance dated Aug. 26, 2019 issued in co-pending U.S. Appl. No. 15/963,498.

REFRIGERATOR

CROSS-REFERENCE TO RELATED APPLICATIONS

This application is a Continuation Application of prior U.S. patent application Ser. No. 15/963,498 filed Apr. 26, 2018, which claims priority under 35 U.S.C. § 119 to Korean Application No. 10-2017-0053880, filed on Apr. 26, 2017, whose entire disclosures are hereby incorporated by reference.

BACKGROUND

1. Field

The present disclosure relates to a refrigerator.

2. Background

In general, a refrigerator refers to a home appliance in which food may be stored in an internal storage space, which is shielded by a door, at a low temperature To achieve this, the refrigerator is configured to accommodate the stored food in an optimum state by cooling the internal storage space using cold air generated through heat exchange with a refrigerant circulating in a refrigeration cycle.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be open/closed by the door. Further, the refrigerator may be classified into various types according to arrangement of the storage space and a structure of the door configured to open/close the storage space In particular, recently, various electronic parts may be provided in a door of the refrigerator, and power supply lines and communication lines for the electronic parts are guided from the door to a main body. Representatively, Korean Unexamined Patent Publication No. 10-2004-0049690 discloses the structure of guiding an electric wire through a hinge serving as a pivot shaft of the door to prevent the electric wire from being exposed to the outside and to prevent the electric wire from being damaged when the door is open.

However, the inner diameter of the hinge shaft cannot help being restricted by a door thickness. Accordingly, when the thickness of the door is a thinner thickness, when the number of electric wires is increased, when the diameter of the electric wire is increased, all electric wires may not be guided through the hinge shaft.

In addition, in the case that the electric wire is not guided through the hinge shaft, when the door is open, the electric wires may be exposed, the exposed wires may be moved, may interfere with another element, may be damaged or may be disconnected, thereby causing severe problems.

BRIEF DESCRIPTION OF THE DRAWINGS

The embodiments will be described in detail with reference to the following drawings in which like reference numerals refer to like elements wherein.

DETAILED DESCRIPTION

Hereinafter, preferred embodiments will be described in more detail with reference to the accompanying drawings. The present disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art.

Figure 1:
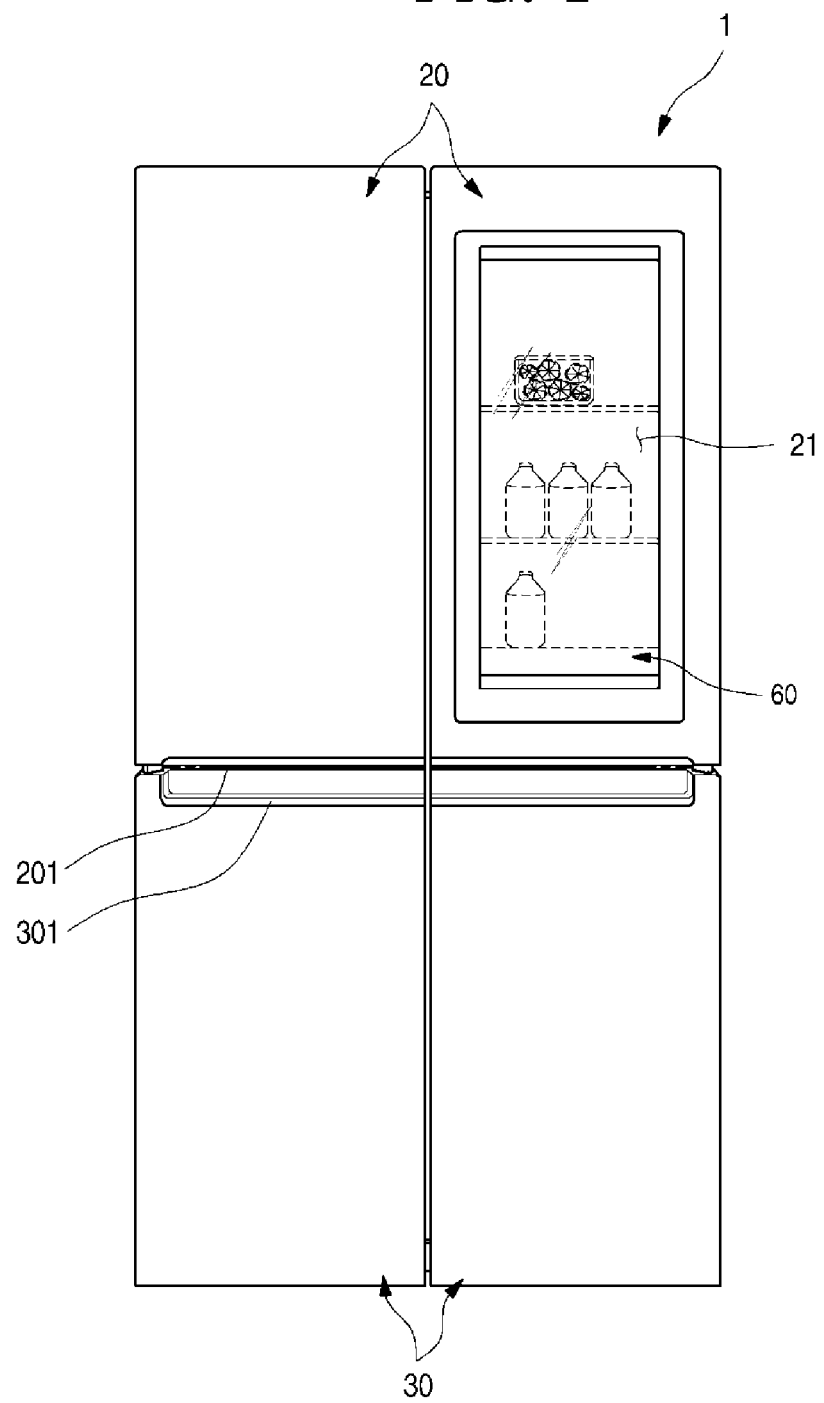
FIG. 1 is a front view illustrating a refrigerator according to an embodiment of the present disclosure.
Figure 2:
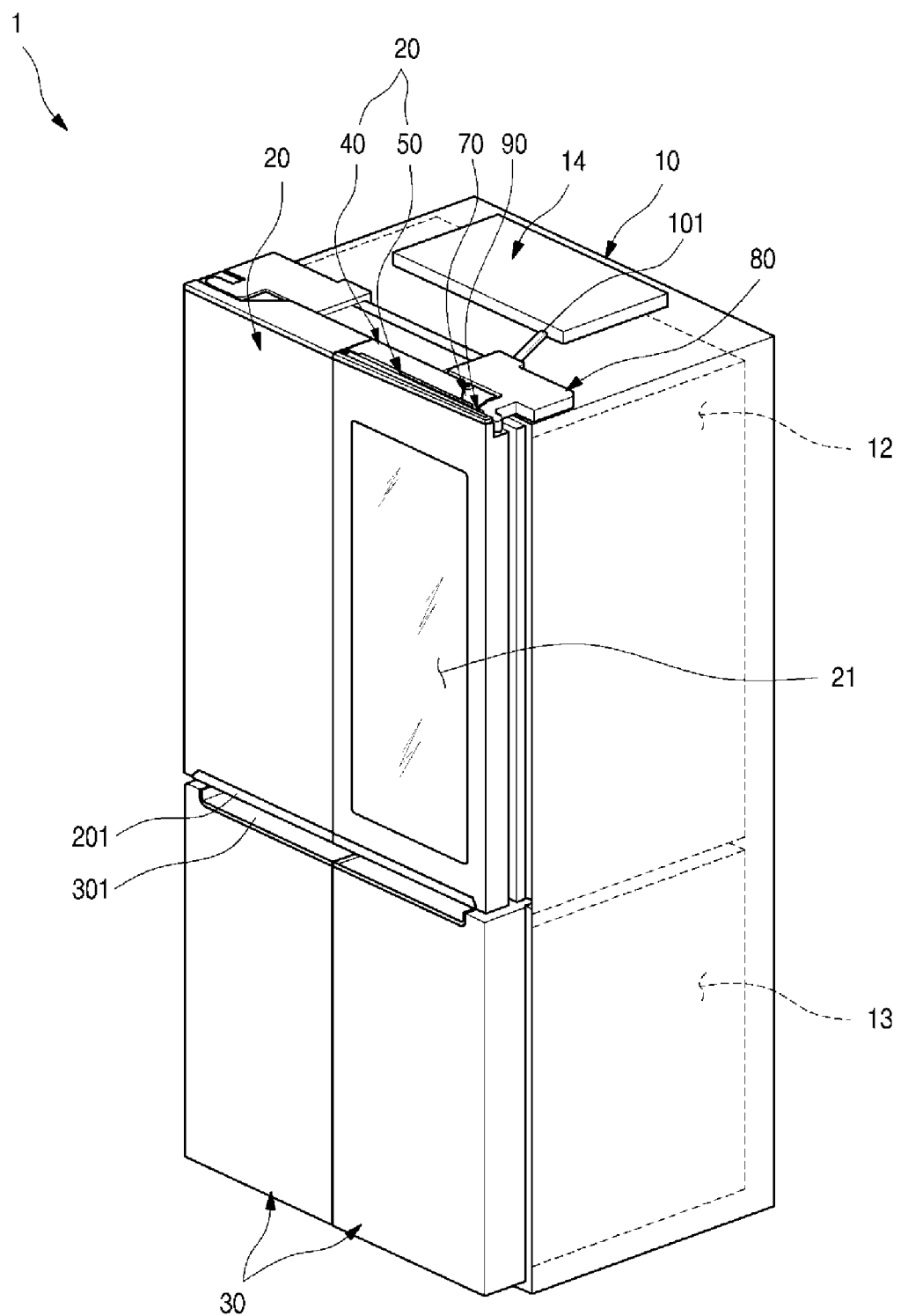
FIG. 2 is a perspective view illustrating the refrigerator of FIG. 2.

FIG. 1 is a front view illustrating a refrigerator according to an embodiment of the present disclosure. FIG. 2 is a perspective view illustrating the refrigerator of FIG. 2.

As illustrated in the drawings, an outer appearance of a refrigerator 1 according to the first embodiment of the present disclosure may be formed by a cabinet 10 defining a storage space and doors configured to open/close the storage space An inner part of the cabinet 10 may be vertically partitioned by a barrier, a refrigerating chamber 12 may be formed at an upper portion the cabinet 10, and a freezing chamber 13 may be formed at a lower portion of the cabinet 10.

Further, a control unit 14 configured to control an overall operation of the refrigerator 1 is formed on an upper surface of the cabinet 10. The control unit 14 may be configured to control electrical components for selectively seeing through a see-through part 21 and outputting a screen as well as a cooling operation of the refrigerator 1.

The door may include refrigerating chamber doors 20 and freezing chamber doors 30. The refrigerating chamber door 20 may be configured to open/close an opened front surface of the refrigerating chamber 12 through pivoting, and the freezing chamber doors 30 may be configured to open/close an opened front surface of the freezing chamber 13 through pivoting Further, the pair of refrigerating chamber doors 20 are provided on left and right sides, and the refrigerator chamber 12 may be shielded by the pair of doors Further, the pair of freezing chamber doors 30 are provided on left and right sides, and the freezing chamber 13 may be opened/closed by the pair of doors In addition, the freezing chamber doors 30 may be configured to be drawn in a drawer form if necessary, and one or more freezing chamber doors 30 may be configured Meanwhile, although an example where a French-type door that includes a pair of doors and opens/closes one space by rotating the doors is applied to a bottom freeze-type refrigerator in which a freezing chamber 13 is provided below is illustratively described in the embodiment of the present disclosure, the present disclosure may be applied to all types of refrigerators having doors regardless of types of the refrigerators Further, recessed handle grooves 201 and 301 may be formed at a lower end of the refrigerating chamber doors 20 and an upper end of the freezing chamber doors 30. A user inserts a hand into the handle grooves 201 and 301 to open/close the refrigerating chamber doors 20 or the freezing chamber doors 30.

Meanwhile, at least one door may be formed to see through an inner part of the refrigerator 1. The see-through part 21, through which a storage space in a rear surface of the door and/or an internal space of the refrigerator 1 may be seen, may be formed in the refrigerating chamber door 20. The see-through part 21 may form at least a part of the front surface of the refrigerating chamber door 20 The see-through part 21 may be selectively transparent or opaque depending on manipulation by the user, and the user may accurately identify food accommodated in the refrigerator 1 through the see-through part 21.

Further, according to the embodiment of the present disclosure, a case that the see-through part 21 is formed in the refrigerating chamber door 20 is described as an example. However, the see-through part 21 may be provided in various other types of refrigerator doors including the freezing chamber doors 30 according to the structure and shape of the refrigerator 1.

The right refrigerating chamber door 20 (when viewed in FIG. 3) of the pair of the refrigerating chamber doors 20 may be dually opened/closed. In detail, the right refrigerating chamber door 20 may include a main door 40 configured to open/close the refrigerating chamber 12 and a sub-door 50 rotatably arranged in the main door 40 to open/close an opening 41 of the main door 40.

The main door 40 may be formed in the same size as that of a left part of a pair of refrigerating compartment doors 20. The upper end of the main door 40 may be pivotably coupled to the cabinet 10 through a main hinge 80. Accordingly, the inner storage space of the cabinet 10 may be open or closed as the main door 40 is rotated. In addition, the main door 40 has an opening at the center thereof. A case 43 may be further provided inside the opening to form an additional receiving space.

The sub-door 50 may be provided at the front surface of the main door 40. The upper end of the sub-door 50 may be pivotably coupled to the main door 40 by a sub-hinge 70. Accordingly, as the sub-door 50 is rotated, an opening 41 of the main door 40 may be open or closed.

When viewed from the front of the refrigerator, the sub-door 50 may have the same size as that of the main door 40. In the state that the main door 40 and the sub-door 50 are closed, the sub-door 50 has the same size as that of the refrigerating compartment door 20. Accordingly, the refrigerator may have an outer appearance as if the sub-door 50 and the main door 40 serve as one door. Such a door form may be called "Door In Door (DID)."

Meanwhile, when a see-through part 21 provided in the sub-door 50 becomes transparent, foods received in the case 43 inside the opening 41 may be visualized.

Figure 3:
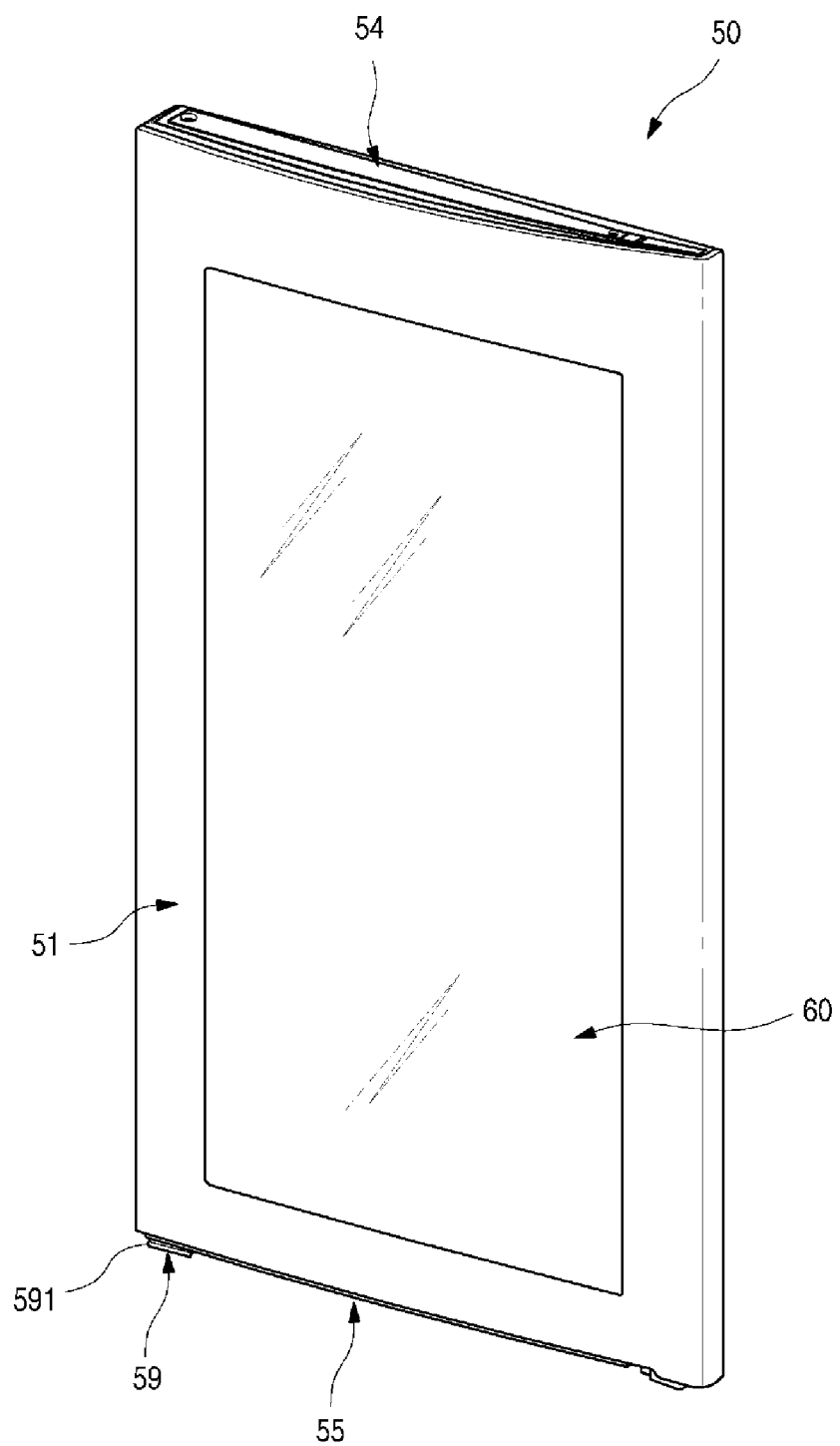
FIG. 3 is a perspective view of the sub-door of the refrigerator.
Figure 4:
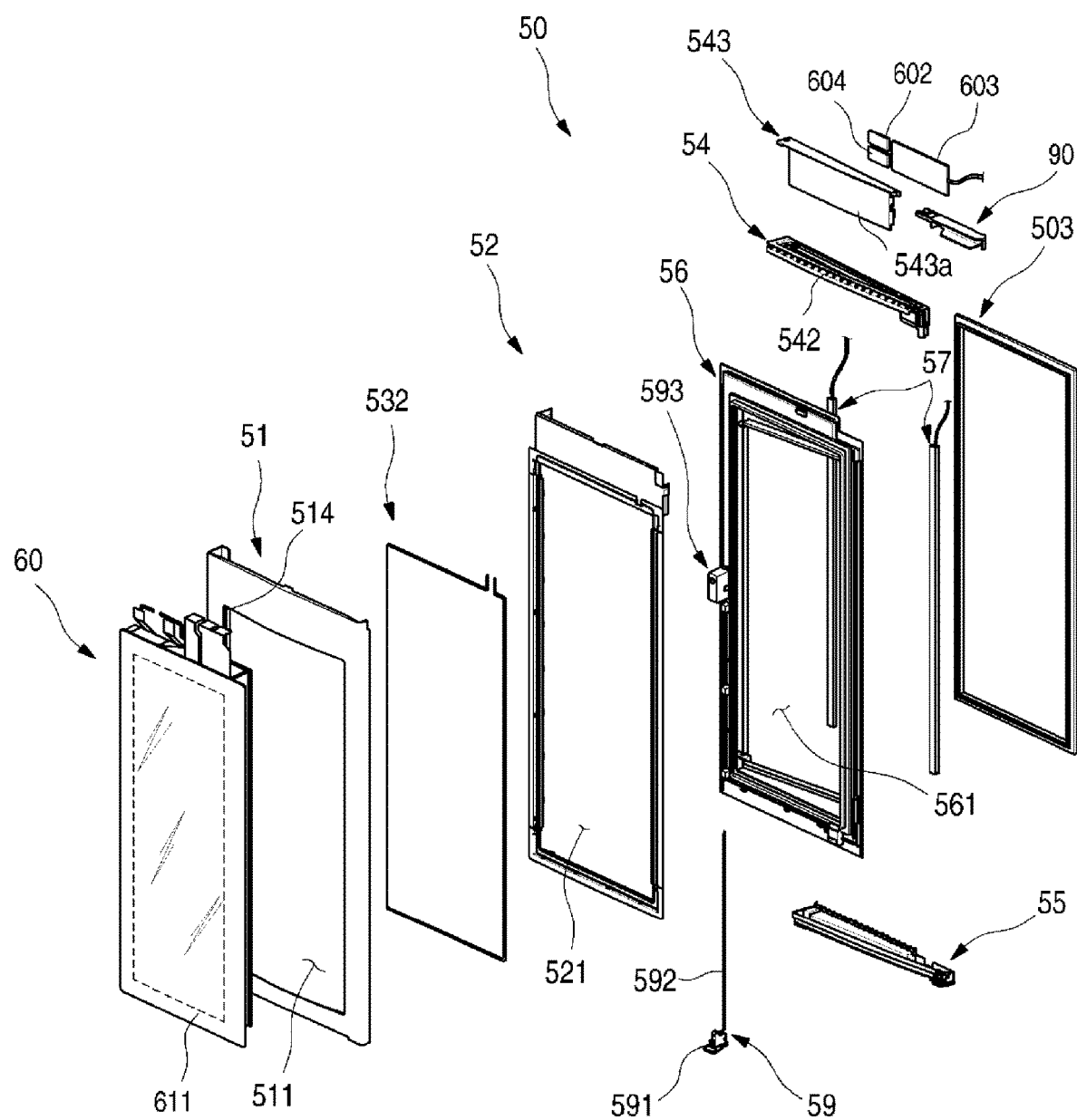
FIG. 4 is an exploded perspective view of the sub-door.

FIG. 3 is a perspective view of the sub-door of the refrigerator. FIG. 4 is an exploded perspective view of the sub-door.

As illustrated in the drawings, the sub-door 50 may include an out plate 51 defining an outer appearance, a door liner 56 spaced apart from the out plate 51, the transparent panel assembly 60 mounted on an opening of the out plate 51 and the door liner 56, and an upper cap decoration 54 and a lower cap decoration 55 defining an upper surface and a lower surface of the sub-door 50, and an outer appearance of the sub-door 50 may be defined by a combination of them The out plate 51, which defines the front surface and a portion of a peripheral surface of the sub-door 50, may be formed of a plate-shaped stainless material. In addition, the out plate 51 may be formed of the same material as those of front surfaces of the refrigerating compartment door 20 and the freezing compartment door 30.

A plate outdoor 511 is formed at the central portion of the front surface of the out plate 51 and the plate opening 511 may be formed to be shield by the transparent panel assembly 60. In addition, the inner part of the refrigerator may be viewed through the transparent panel assembly 60 to shield the plate opening 511. Accordingly, the inner region of the plate opening 511 may be called the see-through part 21.

In addition, a plate bending part 514, which is bent backward, may be formed on a circumferential surface of the plate opening 511. The plate bending part 514 is formed along the circumference of the plate opening 511 while extending by a predetermined length such that the plate bending part 514 is fixedly inserted into a support frame 52 to be described in more detail below. Accordingly, the plate opening 511 may be defined by the plate bending part 514.

The door liner 56 constitutes the rear surface of the sub-door and has a liner opening 561 formed in a region in which the transparent panel assembly 60 is provided. In addition, the door liner 56 may be provided on the rear surface thereof with a sub-gasket 503 to seal between the sub-door 50 and the main door 40.

In addition, door lights 57 may be provided at both sides of the liner opening 561. The door lights 577 may be provided to light up the rear surface of the sub-door 50 and the rear portion of the transparent panel assembly 60. The door light 57 may be called a lighting member. The lighting member may include another light provided in the storage space to light up the refrigerator.

Thus, the door lights 57 may illuminate the internal space of the storage case 43, and at the same time, may functions as auxiliary backlights for the transparent panel assembly 60 to make the screen clearer when the screen of the transparent panel assembly 60 is output. When the door lights 57 are lighted, an interior of the storage case 43 becomes brighter. Thus, the interior of the refrigerator 1 is brighter than an exterior of the refrigerator 1, so that a rear space of the sub-door 50 may be visualized through the transparent panel assembly 60.

Further, the opening device 59 may be mounted on the door liner 56. The opening device 59 may include a manipulation member 591 exposed to the lower end of the sub-door 50, a rod 592 extending from the manipulation member 591, and a locking member 593 protruding from the rear surface of the door liner 56. The rod 592 moves the locking member 593 by manipulation of the manipulation member 592 by the user, so that opening/closing of the sub-door 50 may be manipulated. In other words, in the state that the main door 40 is closed, only the sub-door 50 may be open by manipulating the opening device 59.

The upper decoration 54, which constitutes the top surface of the sub-door 50, are coupled to the out plate 51 and the door liner 56. The top surface of the upper cap decoration 54 has a decoration opening 542 open to communicate with the upper portion of the transparent panel assembly 60 and is covered by a decoration cover 543. In addition, the decoration cover 543 has a printed circuit board (PCB) mounting part 543a such that PCBs 602, 603, and 604 are mounted to operate electronic parts in the transparent panel assembly 60 and the sub-door 50. The PCBs 602, 603, and 604 may be provided in the form of at least one module and may be provided in a closed space of the upper portion of the sub-door 50.

In addition, the space in the upper portion of the sub-door 50 may be divided into a front part and a rear part about the upper portion of the support frame 52. An insulating material 531a may be provided in the front surface of the sub-door 50 and the PCBs 602, 603, and 604 may be provided in the rear space of the sub-door 50. Accordingly, after performing a foaming or insulating process of the sub-door 50, the PCBs 602,603, and 604 may be separately assembled through the decoration opening 542. After the assembling, the work for the The upper decoration 55, which constitutes the top surface of the sub-door 50, are coupled to the out plate 51 and the door liner 56.

The transparent panel assembly 60 may be arranged between the outer plate 51 and the door liner 56. Further, the transparent panel assembly 60 may be configured to shield the plate opening 511 and tee door liner opening 561. Further, the transparent panel assembly 60 may be selectively manipulated by the user in one of a transparent state, a translucent state, an opaque state, and a screen outputting state.

Thus, the user may selectively see through the internal space of the sub-door 50 through the transparent panel assembly 60, and may view the screen output through the transparent panel assembly 60 as well.

In addition, the transparent panel assembly 60 may not include a display 62 for outputting a screen, and the transparent panel assembly 60 without the display 62 may have the same outer appearance as that of the transparent panel display 60 having the display 62 only with a difference in that the screen is not output.

A support frame 52 is mounted on the periphery of the plate opening 511 of the out plate 51 to support the transparent panel assembly 60. The transparent panel assembly 60 may be fixedly mounted on the out plate 51 by the support frame 52. In particular, the front surface of the outer plate 51 and the front surface of the transparent panel assembly 60 are arranged on the same extension line, so that the front surface of the sub-door 50 may have a sense of unity.

The support frame 52 has a frame opening 521 formed at a center thereof, and the frame opening 521 is formed to be slightly smaller than the plate opening 511, so as to provide a structure on which the transparent panel assembly 60 may be seated Further, the frame opening 521 may be formed to be smaller than the front panel 61 and to be larger than the rear panel 65 Accordingly, when the transparent panel assembly 60 is mounted, the rear panel 65 may sequentially pass through the plate opening 511 and the frame opening 521, and then may be seated on the door liner 56 in such a manner that the rear panel 65 is inserted into the front of the door liner 56.

Further, the support frame 52 has a coupling structure with the outer plate 51, and the outer plate 51 and an end of the transparent panel assembly 60 may be mounted in close contact with each other. Thus, when viewed the sub-door 50 from the front side, an end of the outer plate 51 and a periphery of the transparent panel assembly 60 make close contact with each other, so that a gap between the out plate 51 and the transparent panel assembly 60 is rarely viewed or is viewed in a form of a line, and the outer appearance of the front surface may be viewed as having senses of continuity and unity.

The support frame 52 supports the outer plate 51 and the transparent panel assembly 60 and, at the same time, also has a fixing structure for a heater 532 arranged on the rear surface of the transparent panel assembly 60. Thus, the heater 532 may be arranged on the rear surface of the transparent panel assembly 60 while being mounted on the support frame 52, and at this time, may be arranged on a bezel 611 formed along a periphery of the front panel 61, so that structures of the heater 532 and the support frame 70 may not be exposed to the out.

The heater 532 may heat the out plate 51 making contact with the periphery of the transparent panel assembly 60, thereby preventing the dew condensation of the front surface of the out plate 51.

Hereinafter, the structure of the transparent panel assembly will be described in detail with reference to accompanying drawings.

Figure 5:
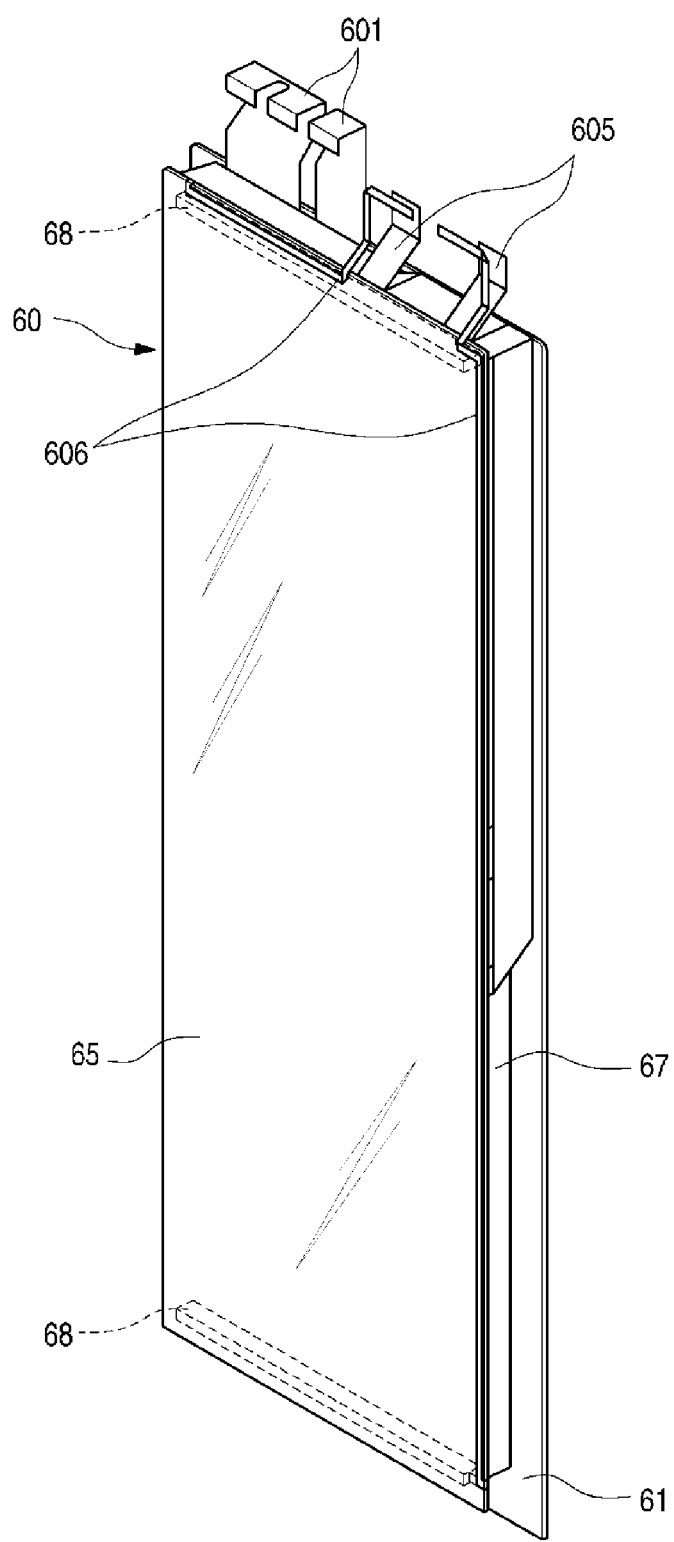
FIG. 5 is a perspective view of the transparent panel assembly of the sub-door.
Figure 6:
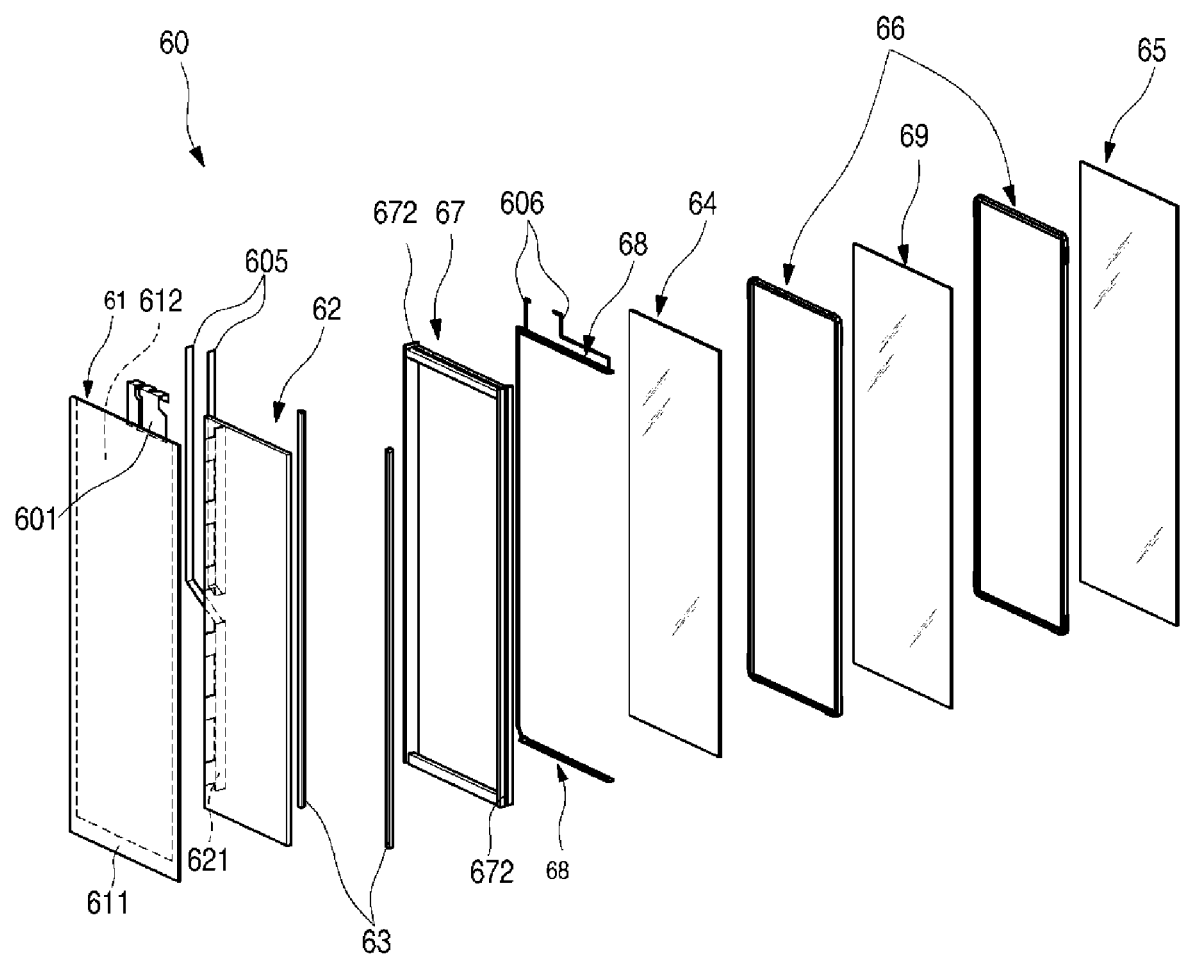
FIG. 6 is an exploded perspective view of the transparent panel assembly.
Figure 7:
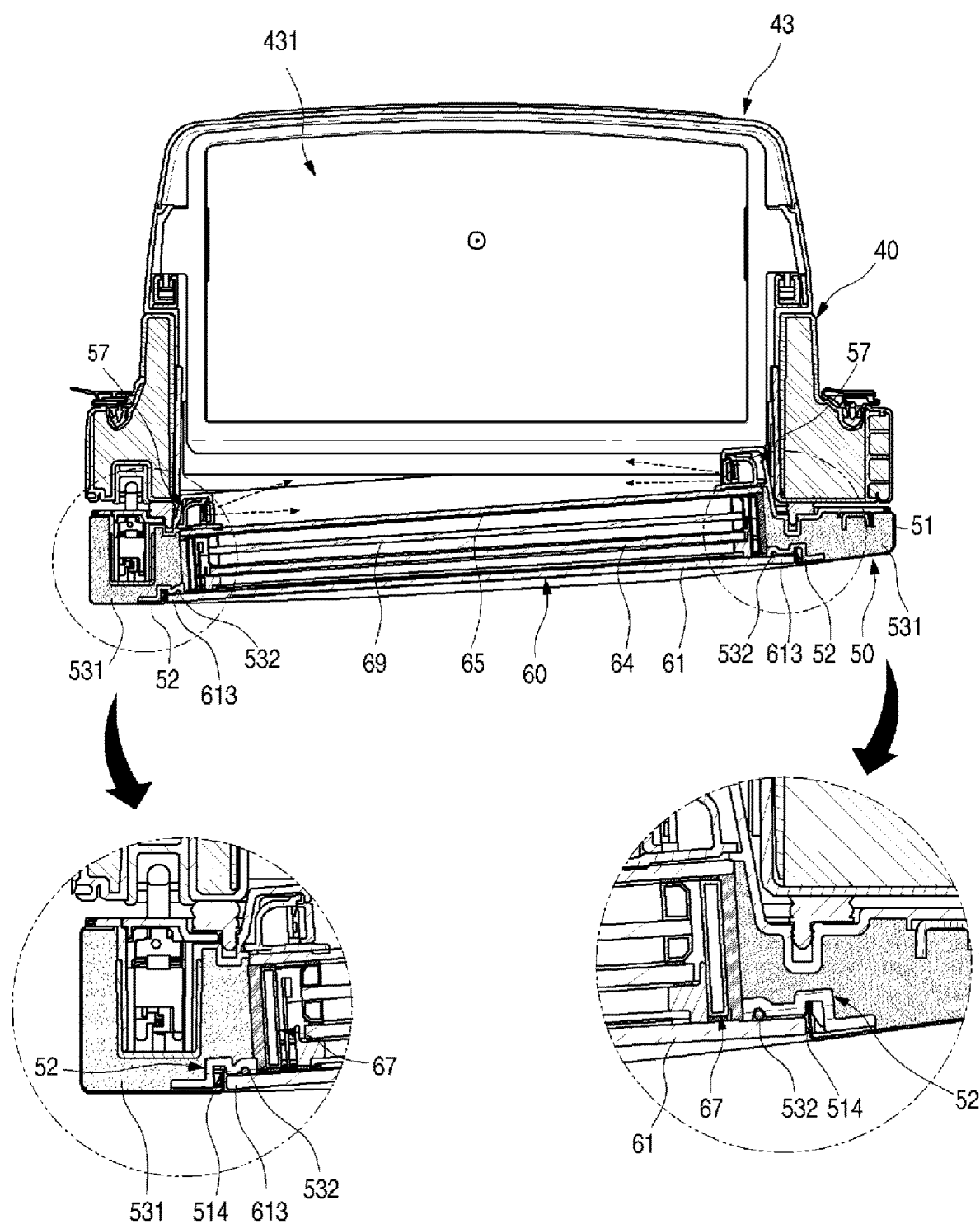
FIG. 7 is a sectional view taken along line 7-7'.

FIG. 5 is a perspective view of the transparent panel assembly of the sub-door. FIG. 6 is an exploded perspective view of the transparent panel assembly. FIG. 7 is a sectional view taken along line 7-7'.

As illustrated in the drawings, the transparent panel assembly 60 may be formed to have a size in which the transparent panel assembly 60 may shield the plate opening 511 and the liner opening 561 from the inner side of the sub-door 50. Further, the see-through part 21 may be formed such that a space in the refrigerator 1 may be selectively visualized and the screen may be output.

The transparent panel assembly 60 may be configured by a plurality of panels having a shape of a plate, and may be configured such that the panels are spaced apart from each other by at least one spacer at a specific interval. The transparent panel assembly 60 may include the front panel 61 and the rear panel 65 defining at least the front surface and the rear surface thereof, and a spacer connecting the front panel 61 and the rear panel 65 between the front panel 61 and the rear panel 65, and may have a structure in which an additional panel and an additional spacer are further provided in an internal space defined by the spacer.

Further, the display 62 and a light guide plate 64 may be interposed between the front panel 61 and the rear panel 65. A first spacer 63 may be further included to support the display 62 and the light guide plate 64, and display lights 68 may be provided to irradiate light to the light guide plate 64.

The front panel 61 may be provided on the rear surface thereof with a film to selectively transmit light depending on an ON/OFF state of a light provided inside the refrigerator 1 or a light provided in the sub-door 50 and thus to be shown selectively transparently or opaquely.

In detail, the front panel 61 may have a front protrusion 613 formed therein to protrude more outward than the rear panel 65. Due to structural characteristics of the front protrusion 613 inserted into and mounted on the front side of the outer plate 51, the front protrusion 613 may protrude more upward/downward/leftward/rightward than the rear panel 65 and the outer spacer 67. Thus, the front panel 61 defining the front surface of the transparent panel assembly 60 may further extend outward the frame opening 701, and thus may be stably supported by the support frame 70. The rear panel 65 and the like as well as the outer spacer 67 may be inserted into the frame opening 701.

Meanwhile, the bezel 611 may be formed along a periphery of the rear surface of the front panel 61. The bezel 611 may be formed by printing with an opaque color such as black, and may be formed to have a predetermined width such that the outer spacer 67, the first spacer 63, the heater 532, and the like may be covered without being exposed to the outside.

A touch sensor 612 may be arranged on the rear surface of the front panel 61. The touch sensor 612 may be formed on the rear surface of the front panel 61 in a printing scheme, and may be configured to detect a touch operation on the front panel by the user. Of course, the touch sensor 612 may employ various other schemes such as a film bonding scheme not the printing scheme, in which input may be performed through a touch on the front panel 61.

A touch cable 601 connected to the touch sensor 612 may be provided at an upper end of the front panel 61. The touch cable 601 may be a flexible film type cable such as a flexible flat cable (FFC) and a flexible print cable or a flexible print circuit board (FPC), and a printed circuit may be printed on the touch cable 601 to form at least a portion of a touch PCB 603. Further, the touch cable 601 may be connected to the touch PCB 603 provided above the sub-door 50.

Further, in addition to the touch cable 601, display cables 605 and display light cables 606 may be formed to have the same structure. In this way, all the cables 601, 605, and 606 formed to have a flat cable shape may extend to an upper end of the transparent panel assembly 60, and may be efficiently arranged on the sub-door 50 having a thin thickness and a wide width. In addition, the cables 601, 605, and 606 may provide a simple connection structure with the PCBs 602, 603, and 604 arranged above the sub-door 50. Accordingly, wires connecting electric parts constituting the transparent panel assembly 60 with each other have a connection structure without being exposed to the outside through the see-through part 21.

Meanwhile, the display 62 may be provided on the rear surface of the front panel 61. The display 62 may be a liquid crystal display (LCD) module configured to output a screen, and may be transparent to be seen through in a state in which the screen is not output.

Source boards 621 may be provided at one end of left and right ends of the display 62. The source boards 621, which are adapted to output the screen of the display 62, may be formed in an assembly state while being connected to the display 62. Further, portions of the source boards 621 may also include a flexible film type cable structure.

Further, the widths of the source boards 621 may be smaller than the thickness of the transparent panel assembly 60, and may be bent while the transparent panel assembly 60 is assembled. At this time, the source boards 621 may be arranged between the outer spacer 67 and the first spacer 63, and may be in contact with an inner surface of the outer spacer 67 while being perpendicular to the front panel 61.

Further, the source boards 621 may be connected to the display cables 605, and the display cables 605 may be connected to the T-CON board 602 above the sub-door 50.

In detail, when the source boards 621 are arranged on the rear surface of the display 62, the source boards 621 may be exposed to the outside through the see-through part 21 due to characteristics of the display 62 which is transparent. Further, when the source boards 621 have a structure protruding sideward, there is a problem in that the size of the sub-door 50 is enlarged.

Thus, the source boards 621 may be formed at a peripheral end of the display 62, and may be provided between the outer spacer 67 and the first spacer 63. Further, the source boards 621 may be formed to have a size corresponding to the outer spacer 67 so as not to depart from the outer spacer 67 in a state in which the source boards 621 are in close contact with the outer spacer 67.

Meanwhile, opposite ends of the display 62 may be supported by the first spacer 63. The first spacer 63 may be formed to have a rod shape extending from an upper end to a lower end of the display 62, and may be formed of aluminum.

The light guide plate 64 may be located behind the display 62, and may be spaced apart from the display 62 by a predetermined distance by the first spacer 63. Here, a sense of depth of the screen output on the display 62 may differ according to the position of the light guide plate 64.

The light guide plate 64, which is adapted to diffuse or scatter light irradiated by the display lights 68, may be formed of various materials. For example, the light guide plate 64 may be formed of polymer, and may be formed such that a pattern is formed on a surface of the light guide plate 64 or a film is attached to the surface of the light guide plate 64. In addition, when the display 62 is not provided, a separate glass or a heat insulating glass instead of the light guide plate 64 may be arranged.

The rear panel 65 may be arranged behind the light guide plate 64. The rear panel 65, which defines the rear surface of the transparent panel assembly 60, may be formed to be larger than the liner opening 561 and may shield the liner opening 561.

A pair of second spacer 66 may be interposed between the rear panel 65 and the light guide plate 64. The second spacers 66 may allow the light guide plate 64 and the rear panel 65 to be spaced apart from each other by a predetermined distance. Further, a heat insulating glass 69 may be provided between the pair of second spacer 66. A multi-layered insulating layer may be provided between the light guide plate 64 and the rear panel 65 by the heat insulating glass 69. Of course, a structure in which the light guide plate 64 and the rear panel 65 are fixed to each other by one second spacer 66 without the heat insulating glass 69 may be adopted as needed.

In the embodiment of the present disclosure, all the spacers 63, 66, and 67 have different structures, but perform support to maintain an interval between the neighboring panels 61 and 65 or the light guide plate 64. Further, various forms such as a rod and a form in which a moisture absorbent is accommodated may be applied to the spacers 63, 66, and 67.

A space between the light guide plate 64 and the rear panel 65 may be sealed by the second spacers 66. Thus, a space between the second spacers 66 and the light guide plate 64 is made to be in a vacuum state or an adiabatic gas for insulation, such as argon, is injected into the space, so that insulation performance may be further improved.

The outer spacer 67 may be formed to have a shape of a rectangular frame, and the outer spacer 67 may connect the rear surface of the front panel 61 and the front surface of the rear panel 65 to each other, and at the same time, may define the peripheral surface of the transparent panel assembly 60.

In detail, the outer spacer 67 defines a periphery of an outer portion of the transparent panel assembly 60, and at the same time, has a structure for connecting the front panel 61 at a specific interval.

A space between the front panel 61 and the rear panel 65, that is, an internal space of the outer spacer 67, may be completely sealed by coupling of the outer spacer 67. Further, the inside of the outer spacer 67 may be further sealed by the sealant 608 applied to the periphery of the outer spacer 67.

The display 62 and the light guide plate 64 may be spaced forward/rearward apart from each other in the space sealed by the outer spacer 67, and the first spacer 63 and the second spacers 66 for maintaining the interval of the light guide plate 64 may be also provided in the internal space of the outer spacer 67.

Of course, an additional insulation panel or a multi-layered glass structure may be further provided inside the outer spacer 67, and these configurations may be provided inside the space defined by the outer spacer 67.

That is, the overall appearance of the transparent panel assembly 60 may be defined by the front panel 61, the rear panel 65, and the outer spacer 67, and all the other configurations may be provided inside the outer spacer 67. Thus, only the spaces between the outer spacer 67, the front panel 61, and the rear panel 65 are sealed, so that the multi-layered panel structure may be completely sealed.

In particular, even when a plate-shaped structure as well as the light guide plate 64 is further provided inside the outer spacer 67, if only the outermost outer spacer 67 adheres to the front panel 61 and the rear panel 65, a sealing structure of the transparent panel assembly 60 may be completed. Such a sealing structure may maintain the minimum sealing points even in the multi-layered structure by a plurality of panels including the light guide plate 64.

Thus, a probability that external air is introduced into the transparent panel assembly 60 or dew is condensed inside the transparent panel assembly 60 due to moisture permeation may be minimized. Further, the inside of the outer spacer 67 is made to be in a vacuum state or a gas for insulation is injected into the outer spacer 67, a heat insulating layer may be formed in the entire multi-layered structure inside the transparent panel assembly 60, thereby further improving insulation performance.

As a result, as the transparent panel assembly 60 is arranged inside the sub-door 50, the interior of the refrigerator may be seen, the screen may be output, and an insulation structure may be completed in the multi-layered panel structure, so that insulation performance may be ensured.

Further, a space on which the display lights 68 may be mounted may be provided on an inner surface of the outer spacer 67. The display lights 68 may be mounted at an upper end and a lower end of the outer spacer 67, and the light guide plate 64 may be located between the display lights 68 arranged at the upper end and the lower end of the outer spacer 67.

Thus, light irradiated by the display lights 68 may be directed toward an end of the light guide plate 64, and may be moved along the light guide plate 64 so that the light guide plate 64 may emit light from the entire surface thereof.

Meanwhile, the display lights 68 located at an upper end and a lower end of the inside of the transparent panel assembly 60 may be connected to the display light cables 606. The display light cables 606 may be formed to have a flexible and flat shape, which is like the touch cable 601 and the display cables 605.

The display light cables 606 may be connected to the display lights 68 mounted inside the outer spacer 67 and may extend toward the outside of the transparent panel assembly 60.

Further, the display light cables 606 may extend along a periphery of the transparent display 62 so as not to be exposed through the transparent display 62. Further, the display light cables 606 may extend upwards while being in close contact with the rear panel 65, and may be bent while being in contact with the rear surface of the rear panel 65, to be connected to the docking PCB 604 above the sub-door 50 as needed.

Hereinafter, the operating state of the transparent panel assembly will be described in more detail with reference to accompanying drawings.

Figure 8:
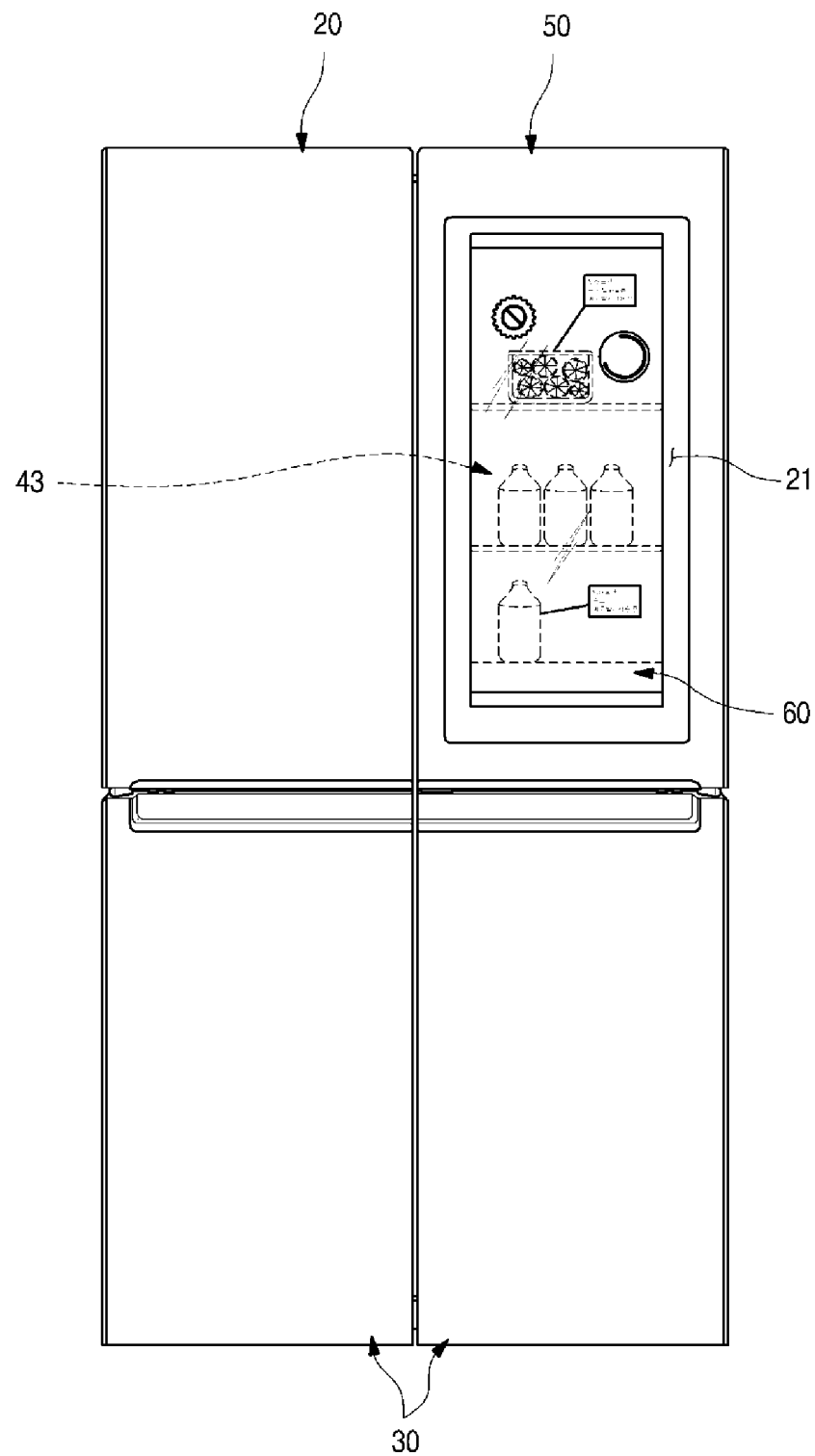
FIGS. 8 and 9 are perspective views illustrating the operating state of the transparent panel assembly.
Figure 9:
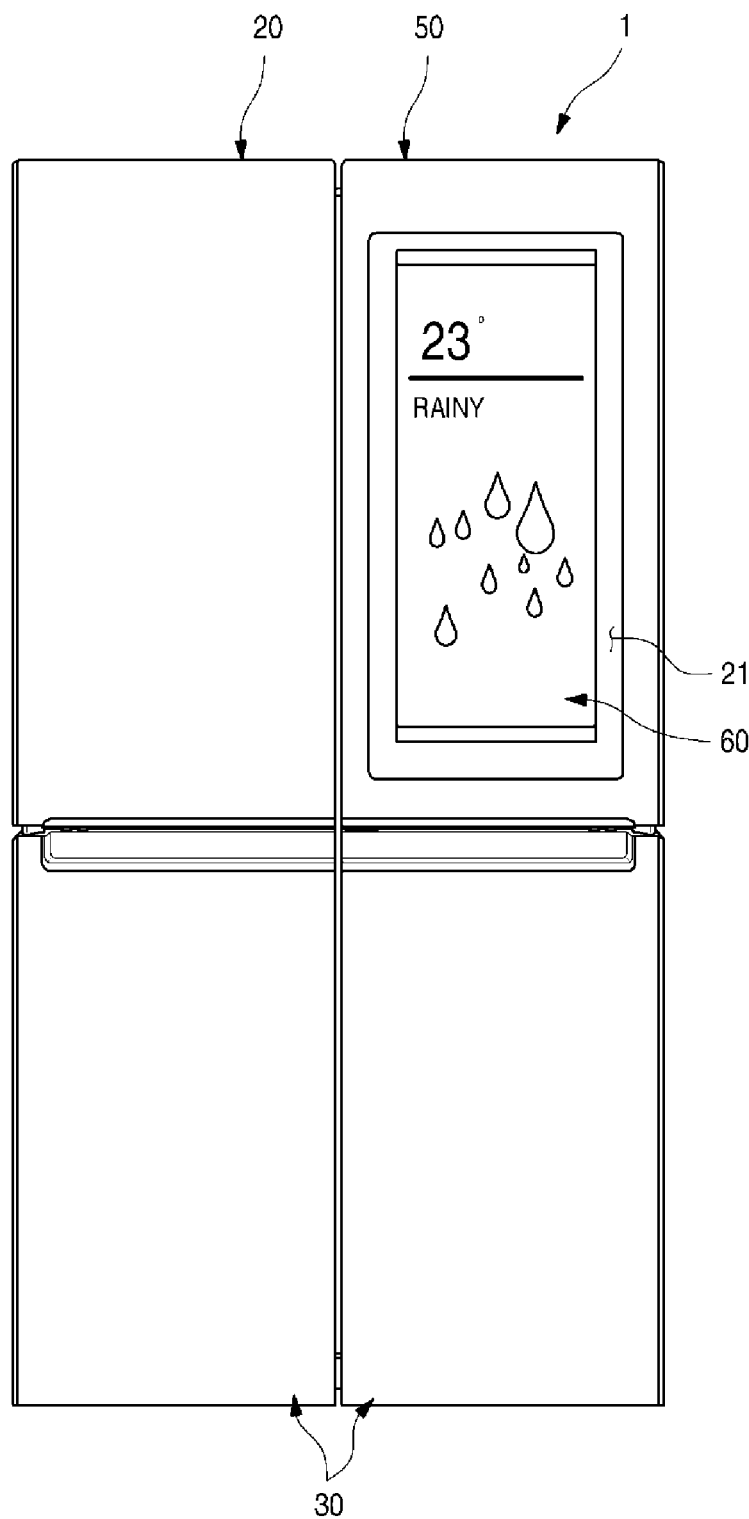

FIGS. 8 and 9 are perspective views illustrating the operating state of the transparent panel assembly.

As illustrated in drawings, in the state that the sub-door 50 and the main door 40 are closed, both of the door light 57 and the display light 68 are maintained in OFF states when any manipulation is not made.

When the door light 57 and the display light 68 are in OFF states, the rear space of the sub-door 50 becomes dark and the inner part of the refrigerator is not shown through the see-through part 21 as illustrated in FIG. 2. Accordingly, when additional manipulation is not made in the state that the sub-door 50 is closed, the door light 57 is maintained in the off state so that the inner part is not shown through the see-through part 212.

In this state, the user turns on the door light 57 by touching the front panel 51 or performing an additional manipulation. If the door light 57 is switched on, the irradiated light is applied to positions facing from left and right positions of the rear portion of the rear panel 65.

The door lights 57 may extend an upper end to a lower end of the rear panel 65. That is, the light light irradiated by the door lights 57 may illuminate the entire rear region of the rear panel 65 on the opposite left and right sides of the rear panel 65.

At this time, when the display lights 86 are switched on together, light beams may be irradiated from the upper side and the lower side by the display lights 68, and the light beams may be irradiated from the left side and the right side by the door lights 57. As a result, the light beams may be irradiated from all the upper, lower, left, and right sides of the see-through part 21, and a region of the see-through part 21 may be illuminated in the maximum brightness.

The door lights 57 irradiates the light beams in a direction in which the light beams face each other, while being adjacent to the rear panel 65. The light beams irradiated by the door lights 57 may illuminate the internal space of the storage case 43, and may illuminate the front side via the rear panel 65 as well. Thus, as illustrated in FIG. 8, the door lights 57 may serve as lights configured to illuminate a space inside the refrigerator 1, which is seen through the see-through part 21, and at the same time, may serve as auxiliary backlights through which the display 62 may be seen more clearly.

That is, in a state in which the screen is output through the display 62, the space inside the refrigerator 1, that is, a space behind the sub-door 50, may be selectively seen through the see-through part 21.

To allow the space behind the sub-door 50 to be seen through the see-through part 21, the door lights 57 may be switched on. If the output of the screen is not required through the display 62 and only the visualization of the receiving case 43 is required, the display light 68 is switched off and only the door light 57 is maintained in an ON state.

Of course, various representations may be achieved through a combination of ON/OFF states of the display lights 68 and the door lights 57 according to a degree to which the inside of the storage case 43 is visualized through the see-through part 21.

Further, when the user manipulates the front panel 61 on the front surface of the refrigerator 1, the display lights 68 are switched on, the display 62 is switched on, and thus, the transparent panel assembly 60 may output the screen, as illustrated in FIG. 9. At this time, the manipulation of the front panel 61 may correspond to input of any one of a specific position, the number of times of touches, and a pattern. Of course, if necessary, the manipulation by the user may be detected using a separate physical button or a sensor.

The display 62 may output the screen for displaying a state of the refrigerator 1 and performing manipulation, and may also output various screens for performing the Internet, outputting an image, performing output using an external input device, and displaying information on received food.

In detail, the display lights 68 arranged at an upper end and a lower end of the light guide plate 64 may be switched on together with the display 62 by the manipulation by the user. The display lights 68 are switched on, and thus the light guide plate 64 diffusely reflects and diffuses light of the display lights 68, so that the light may be irradiated toward the display 62 on the front side in a wholly uniform brightness.

The light is irradiated from the rear side of the display 62 toward the display 62 by the light guide plate 64, and at the same time, the screen is output based on image information input from the display 62. Thus, the user may identify the clearly output screen through the see-through part 21.

Meanwhile, in the refrigerator 1 according to the embodiment of the present disclosure as described above, the sub-door 50 and the main door 40 may include a plurality of electronic parts such as the display 62, the touch sensor 612, the door light 57, the display light 68, and the heater 532. The arrangement of wires for driving the electronic parts are required and the connection between the wires and the control unit 14 provided on the top surface of the cabinet 10 are required.

Hereinafter, the wire arrangement structure of the sub-door 50, the main door 40, and the cabinet 10 will be described.

Figure 10:
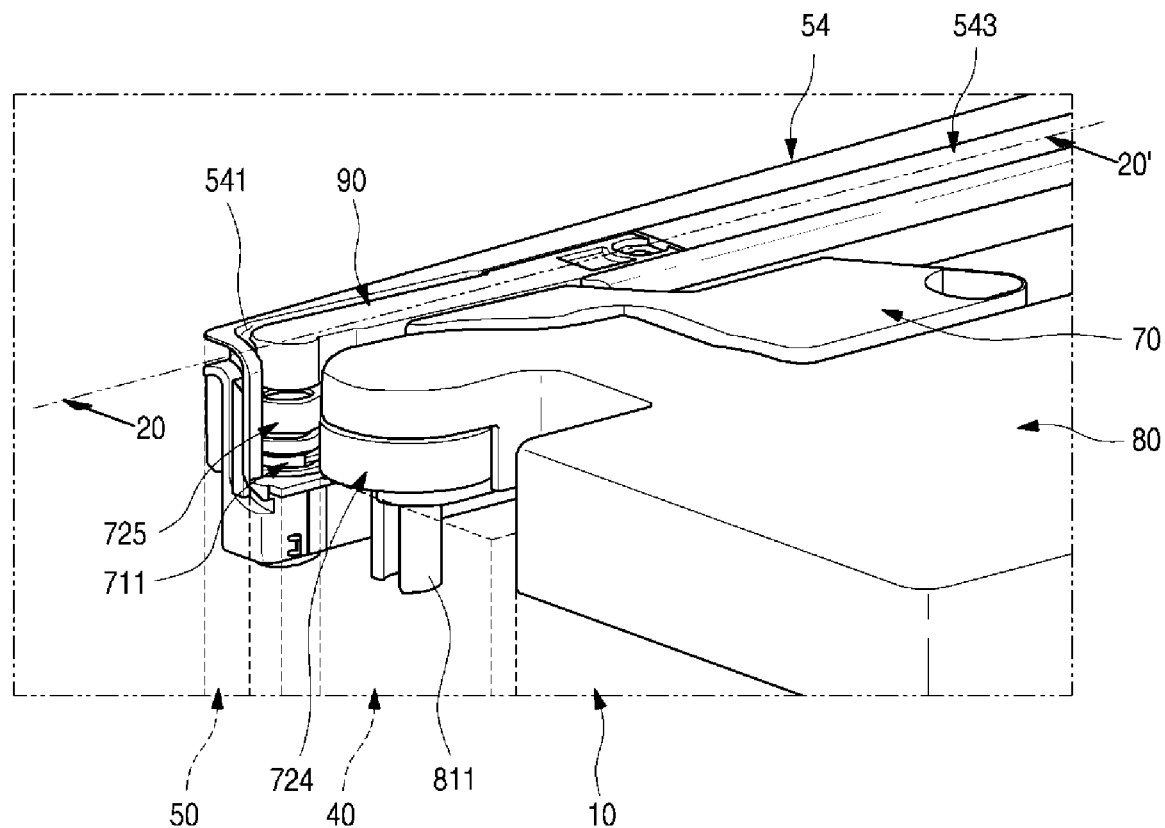
FIG. 10 is a partial perspective view illustrating the assembling structure between the upper ends of the sub-door and the main door.
Figure 11:
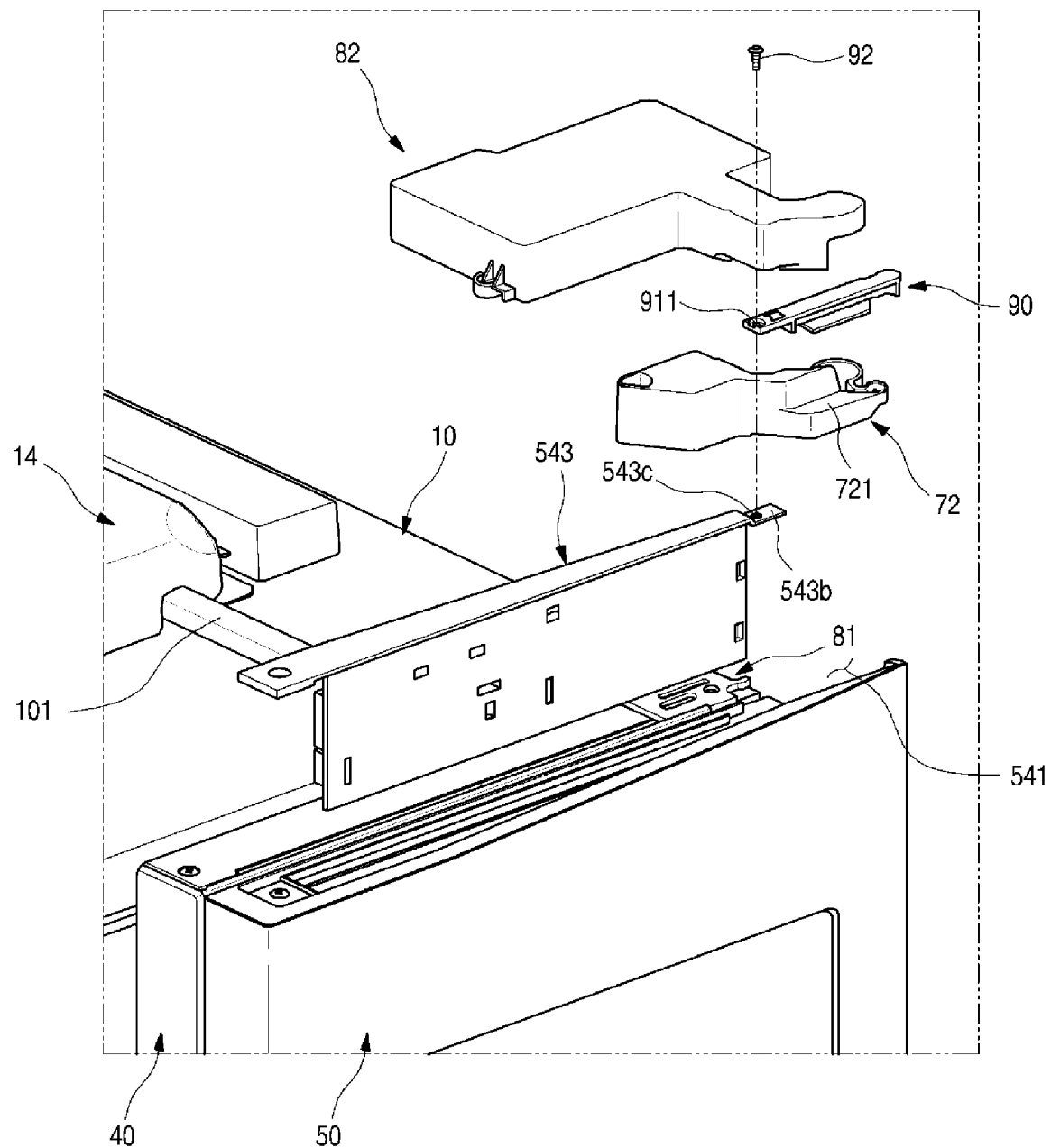
FIG. 11 is a front exploded perspective view the assembling structure between the upper ends of the sub-door and the main door.
Figure 12:
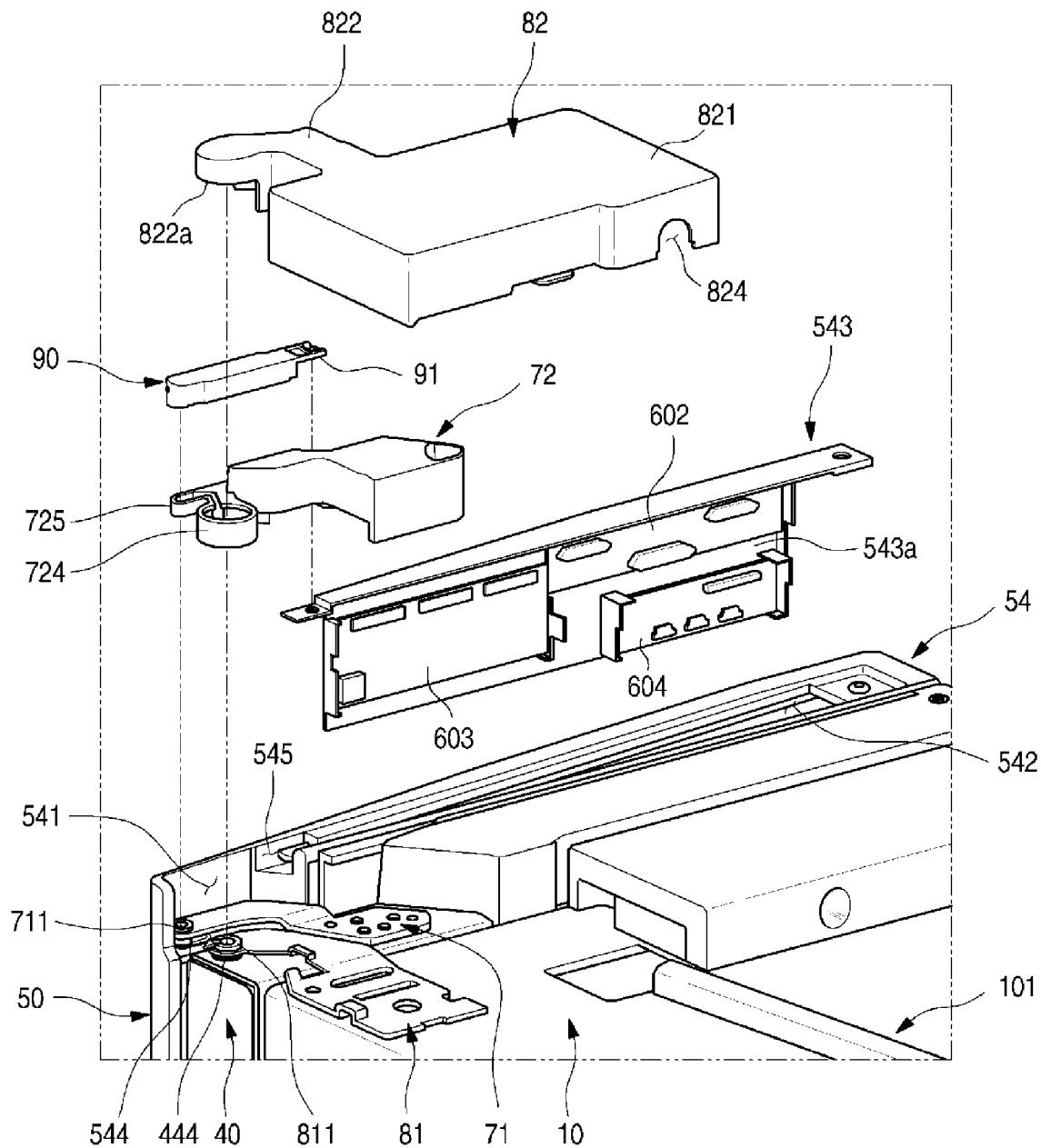
FIG. 12 is a rear exploded perspective view the assembling structure between the upper ends of the sub-door and the main door.

FIG. 10 is a partial perspective view illustrating the assembling structure between the upper ends of the sub-door and the main door. FIG. 11 is a front exploded perspective view the assembling structure between the upper ends of the sub-door and the main door. FIG. 12 is a rear exploded perspective view the assembling structure between the upper ends of the sub-door and the main door.

As illustrated in accompanying drawings, the outer appearance of the upper end of the sub-door 50 may be formed by the upper cap decoration 54 provided in the upper end of the sub-door 50. In addition, the decoration opening may be exposed.

The decoration opening 542 may be shielded by the decoration cover 543 mounted on the upper cap decoration 54. The decoration cover 543 may be mounted in the upper cap decoration 54 in the state that the PCBs 602, 603, and 604 are mounted in the decoration cover 543.

Meanwhile, the upper cap decoration 54 may have the hinge mounting part 541 recessed therein such that the sub-hinge 70 is mounted in the hinge mounting part 541. In addition, the hinge mounting part 541 may have a surface making a step difference from a part in which the decoration opening 542 is formed. The hinge mounting part 541 may be defined by the whole space recessed from one layer of the upper cap decoration 54.

The sub-hinge 70 may be mounted at one side of the hinge mounting part 541. The sub-hinge 70, which rotatably couples the upper end of the sub-door 50 to the upper end of the main door 40, may include a sub-hinge plate 71 and a sub-hinge cover 72 to shield the upper portion of the sub-hinge plate 71.

In addition, the hinge mounting part 541 may have a sub-hinge hole 544 into which the sub-hinge shaft 711 of the sub-hinge plate 71 is inserted. In addition, the sub-hinge shaft 711 may have a hollow tubular shape. As the sub-hinge shaft 711 is inserted into the sub-hinge hole 544 to communicate with a space which is formed in the upper portion of the sub-door 50 to receive the PCBs 602, 603, and 604. Accordingly, some of wires connected with the PCBs 602, 603, and 604 may be guided to the outside of the sub-door 50 while passing through the sub-hinge shaft 711.

In more detail, a display wire 501 connected with the T-con board, which is to control the display 62, among the PCBs 602, 603, and 604 passes through the sub-hinge hole 544, that is, the sub-hinge shaft 711.

The display wire 501 includes a multiple stands of fine wires due to the structural characteristic thereof. Such a structural characteristic makes it difficult to provide a connection structure at the outside of the sub-door 50 by using connectors to be coupled to each other. Accordingly, the display wire 501 may be directly connected to the control unit 14 from the t-con board 602. In this case, the display wire 501 passes through the sub-hinge shaft 711. The display wire 501 may be referred to a first wire.

The display wire 501 may pass through the sub-hinge shaft 711 in the state that the display wire 501 is surrounded by a protection member 501a such as a mesh tube or a shrink tube. Accordingly, the display wire 501 may be prevented from being damaged and noise may be prevented.

Meanwhile, a wire entrance part 545 is further formed at one side of the upper cap decoration 54. The wire entrance part 545 has an opening allowing wires 502, 503, 504, and 505, which fail to pass through the sub-hinge shaft 711 due to the restricted diameter of the sub-hinge shaft 711. The wires 502, 503, 504, and 505 may be referred to as "third wires."

In detail, the wire entrance part 545 may be open toward the hinge mounting part 541. The wire entrance part 545 is formed to be open at a position that is not shielded by the decoration cover 543 and formed to communicate with a space in which the PCBs 602, 603, and 604. Accordingly, the wires connected to the PCBs 602, 603, and 604 may be easily withdrawn toward the hinge mounting part 541 through the wire entrance part 545.

The wires guided through the wire entrance part 545 may be wires connected with electronic parts inside the sub-door 50 except for the display wire 501. For example, the wires 502, 503, 504, and 505 may include at least one of a heater wire 502 connected with the heater 532, a touch sensor wire 503 connected with the touch sensor 612, a ground wire 504 to prevent static electricity caused in manipulating the touch sensor 612, and a microphone wire 505 provided in the sub-door 50 and connected with the microphone when a microphone is provided to receive a user voice. In addition, if necessary, other wires (such as a door light wire connected with the door light 57) connected with electronic parts provided in the sub-door 50 may be input and output through the wire entrance part 545.

Meanwhile, the upper cap decoration 54 may include a sub-cover 90. The sub-cover 90 is to shield the wires 502, 503, 504, and 505 extending from the wire entrance part 545 to the sub-hinge cover 72. The sub-cover 90 may be formed to extend from the wire entrance part 545 to the upper portion of the sub-hinge shaft 711. The sub-cover 90 may be referred to a first cover.

In addition, the sub-cover 90 may be configured to be fixedly mounted on the upper cap decoration 54 and seated in a cover seating part 721 formed in the sub hinge cover 72 in the state that the sub-cover 90 is mounted.

In other words, in the state that the sub-door 50 is closed, the sub-cover 90 is maintained in a seating state in the cover seating part 721. When the sub-door 50 is open, the sub-cover 90 rotates together with the sub-door 50 in the state that the sub-cover 90 is coupled to the sub-door 50. The wires 502, 503, 504, and 504 guided from the wire entrance part 545 may be guided to the position corresponding to the sub-hinge shaft 711 along with the sub-cover 90 without being exposed to the outside.

The sub-hinge plate 71 may be fixedly mounted on the upper end of the main door 40 and the sub-hinge shaft 711 may be axially coupled to the sub-hinge hole 544 of the sub-door 50. In addition, the hinge plate 71 may be provided at the upper portion thereof with the sub-hinge cover 72. The sub-hinge cover 72 may be configured to shield the sub-hinge plate 71 while guiding the arrangement of the wires 502, 503, 504, and 505 guided from the sub-hinge plate 71. The sub-hinge cover 72 may be configured not to be exposed to the outside even when the sub-door 50 and the main door 40 are rotated. IN addition, the sub-hinge cover 72 may shield a portion of the main hinge plate 81. The sub-hinge cover 72 may be referred to as a second cover.

The sub-hinge cover 72 may have a structure of coupling the sub-hinge shaft 711 to the main hinge shaft 811. In addition the sub-hinge cover 72 may be formed to shield both upper portions of the sub-hinge shaft 711 and the main hinge shaft 811 in the state that the sub-hinge cover 72 is mounted in the main door 40.

Accordingly, the wires 502, 503, 504, and 505 of the sub-door 50 may be guided via the sub-hinge shaft 711 and the main hinge shaft 811 and may be shielded by the cover member in the process that the sub-door 50 and the main door 40 are rotated to be prevented from being exposed to the outside. In addition, in the process that the sub-door 50 and the main door 40 are rotated, the wires may be prevented from being moved or interfering.

The hinge cover 72 may be interposed in a space between the sub-cover 90 and the main hinge cover 82. In addition, in the state that the sub-door 50 is closed, the cover seating part 721 may be formed such that the sub-cover 90 is seated in the cover seating part 721.

Meanwhile, the main hinge cover 82 may be mounted on the top surface of the cabinet 10. The main hinge cover 82, which shields the main hinge plate 81, receives the main hinge plate 81 in the state that the main hinge cover 82 is mounted in the cabinet 10. The main hinge cover 90 may be referred to a third cover.

In this case, a portion of the main hinge cover 82 may extend to the upper portion of the main hinge shaft 811. In addition, the main hinge cover 82 may be configured to overlap with one side of the sub-hinge cover 72 at the upper portion of the main hinge shaft 811.

Accordingly, in the state that the sub-hinge cover 72 is mounted, the sub-cover 90 is placed at the upper portion of the sub-hinge shaft 711 and the main hinge cover 82 may be placed at the upper portion of the main hinge shaft 811.

Hereinafter, elements of the sub-cover 90, the sub-hinge cover 72, and the main hinge cover 82 will be described in more detail with reference to accompanying drawings.

Figure 13:
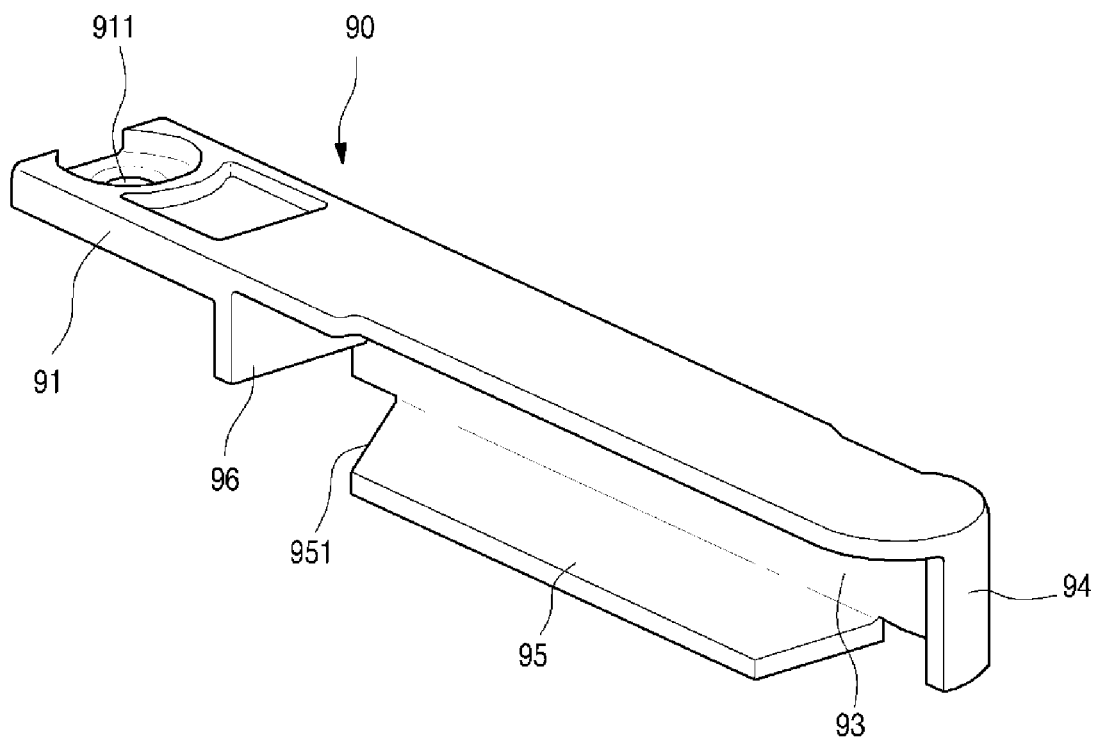
FIG. 13 is a perspective view of the sub-cover according to an embodiment of the present disclosure.
Figure 14:
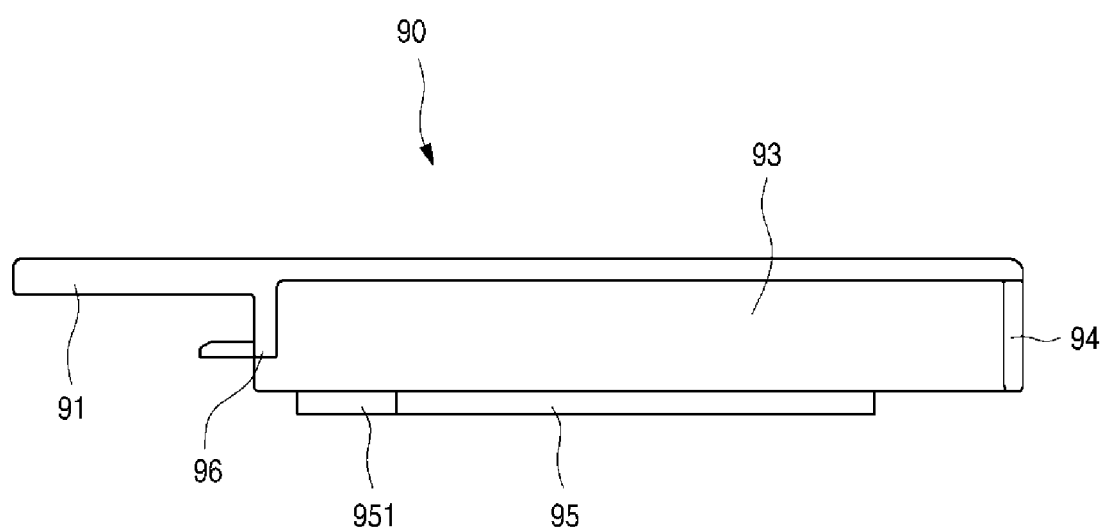
FIG. 14 is a front view of the sub-cover.

FIG. 13 is a perspective view of the sub-cover according to an embodiment of the present disclosure and FIG. 14 is a front view of the sub-cover.

Although not illustrated in FIGS. 13 and 14, the sub-cover 90 may be mounted to cross the hinge mounting part 541 and may extend from the wire entrance part 545 to the sub-hinge shaft 711.

The sub-cover 90 may be configured to form the same plane as the top surfaces of the upper cap decoration 54 and the decoration cover 543 in the state that the sub-cover 90 is mounted in the upper cap decoration 54. A coupling part 91 may be formed at one end of the sub-cover 90. The coupling part 91 may extend toward the decoration cover 543 such that the coupling part 91 overlaps with one side of the decoration cover 543. In addition, the coupling part 91 may be formed to be seated in the cover mounting part 543*b* formed with a step difference in the decoration cover 543.

In addition, the coupling part 91 may be formed therein with a coupling hole 911 such that a coupling member 92 such as a screw passes through the coupling hole 911. The coupling hole 911 may be disposed above the same position as that of the coupling hole 543*c* formed in the decoration cover 543. Accordingly, the sub-cover 90 and the decoration cover 543 may be simultaneously fixed to one coupling member 92.

The sub-cover 90 may have an opening formed at a front surface thereof making contact with an inner surface of the hinge mounting part 541 and a shielding part 93 may be formed at a rear surface of the sub-cover 90 facing the main door. Accordingly, in the state that the sub-cover 90 is mounted, a space is formed in the sub-cover 90 to withdraw the wires 502, 503, 504, and 505 from the wire entrance part 545. In addition, the wires 502, 503, 504, and 505 may not be prevented from being exposed from the wire entrance part 545 to the sub-hinge shaft 711 in the state that the sub-cover 90 is mounted.

Meanwhile, a round part 94 is formed at an end portion of the sub-cover 90 and a portion of the round part 94 is cut out and open. Since the sub-cover 90 extends the sub-hinge shaft 711, when the sub-door 50 is rotated, an end portion of the sub-cover 90 is formed not to interfere with the upper cap decoration 54.

A seating surface 95, which is bent, may be formed at a lower end of the shielding part 93. The seating surface 95 shields a portion of a bottom surface of an open inner space of the sub-cover 90 while providing a seating surface to the cover mounting part 721 formed in the sub-hinge cover 72. Accordingly, in the state that the sub-door 50 is open, the wires 502, 503, 504, and 505 guided through the sub-cover 90 is prevented from being exposed and prevented from interfering with the sub-hinge cover 72 or the main door 40.

In addition, the seating surface 95 is formed on one end thereof with an inclination surface 951 making close contact with a wall surface extending toward the upper portion of the hinge mounting part and is formed on an opposite end thereof with an open space to guide the wires 502, 503, 504, and 505 toward the sub-hinge shaft 711.

In addition, the sub-cover 90 may be formed therein with a coupling guide part 96 extending downward. The coupling guide part 96 may be configured to be inserted from the inner surface of the sub-cover 90 toward the wire entrance part 545.

Figure 20:
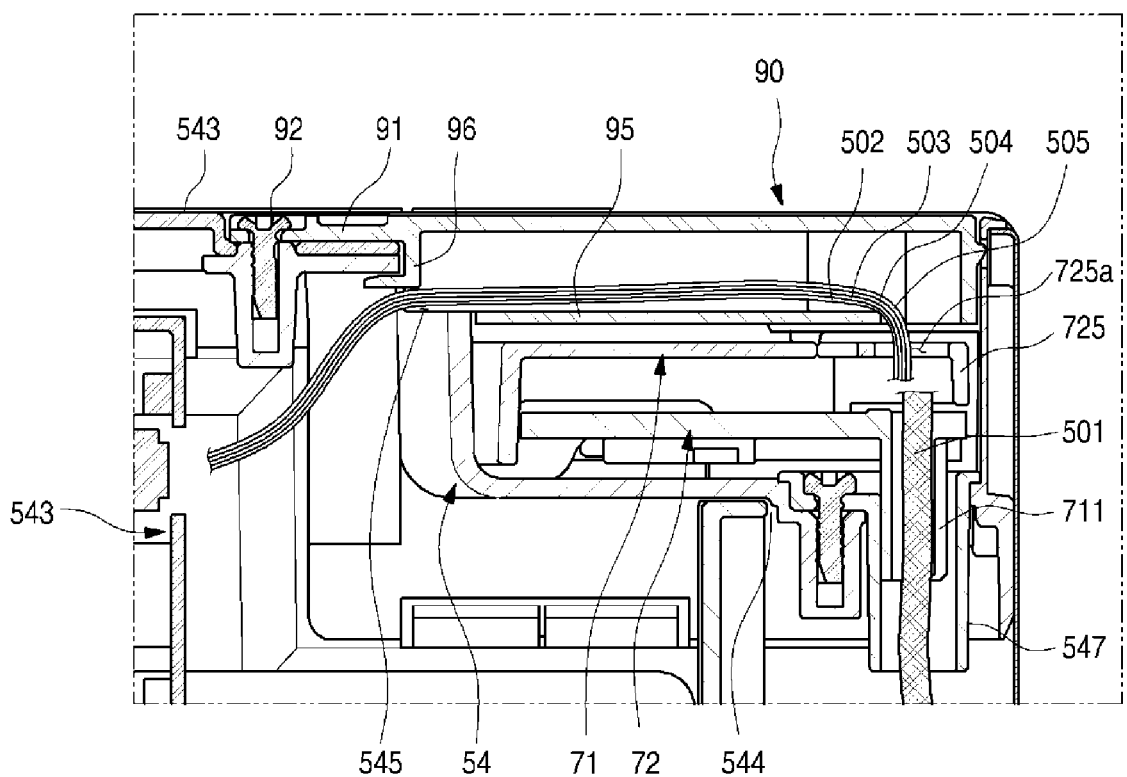
FIG. 20 is a sectional view taken along line 20-20' of FIG. 10.
Figure 21:
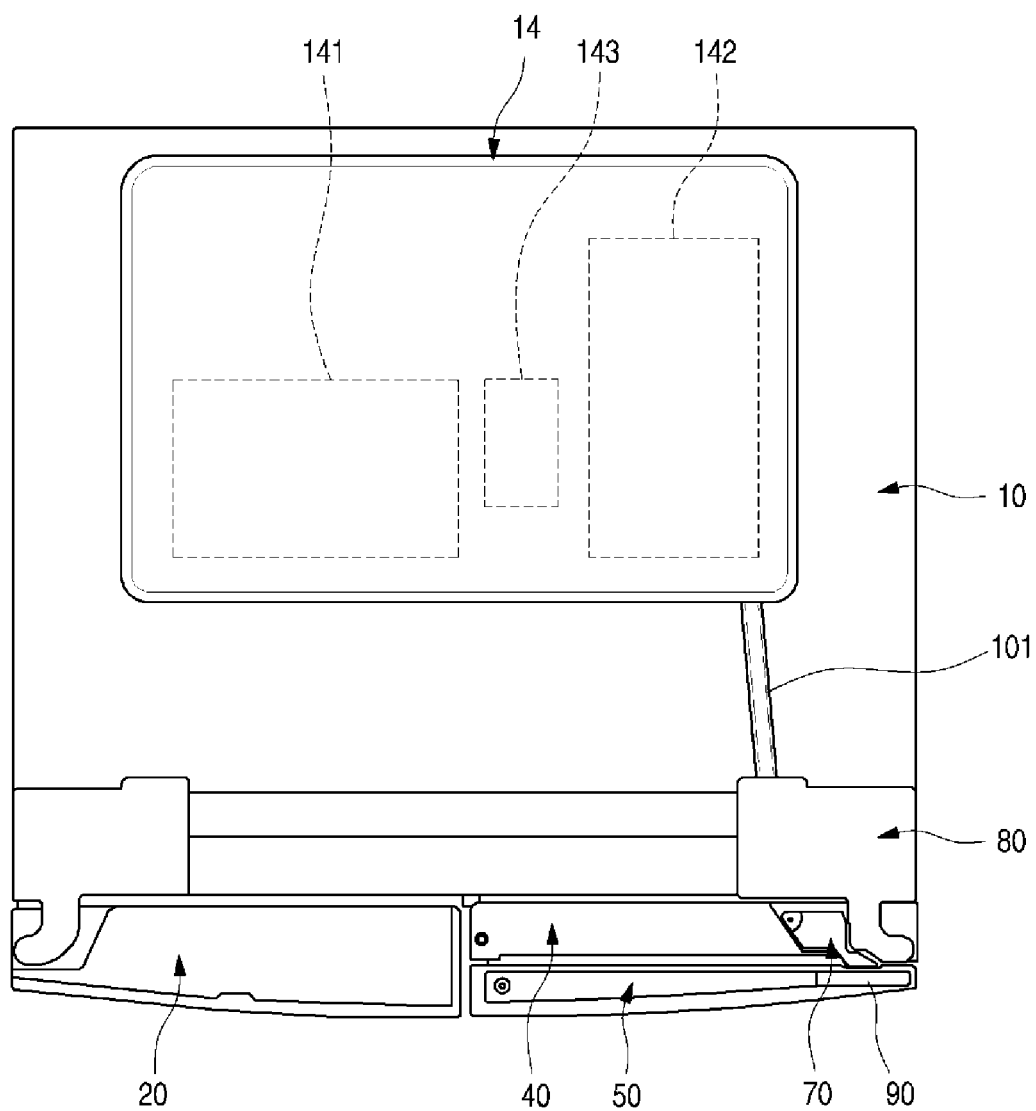
FIG. 21 is a view illustrating the top surface of the refrigerator.

As illustrated in FIG. 20 in detail, the coupling guide part 96 may extend downward from the inner top surface of the sub-cover 90 and the extending end portion may be bent toward the inner part of the wire entrance part 545. Accordingly, when the sub-cover 90 is mounted on the upper cap decoration 54, the upper end of the wire entrance part 545 is inserted into the coupling guide part 96 such that the wire entrance part 545 is coupled to the coupling guide part 96. In addition, the end portion of the seating surface 95 makes contact with the surface extending vertically from the hinge mounting part 541 such that the end portion of the seating surface 95 is arranged at an exact position of the sub-cover 90. In this state, the coupling member 92 is coupled such that the sub-cover 90 is fixedly mounted inside the hinge mounting part 541.

Due to such a structure, the inner part of the upper cap decoration 54 may communicate with the inner part of the sub-cover 90 through the wire entrance part 545. In addition, the wires inside the sub-door 50 may be guided into the sub-cover 90 through the wire entrance part 545.

Figure 15:
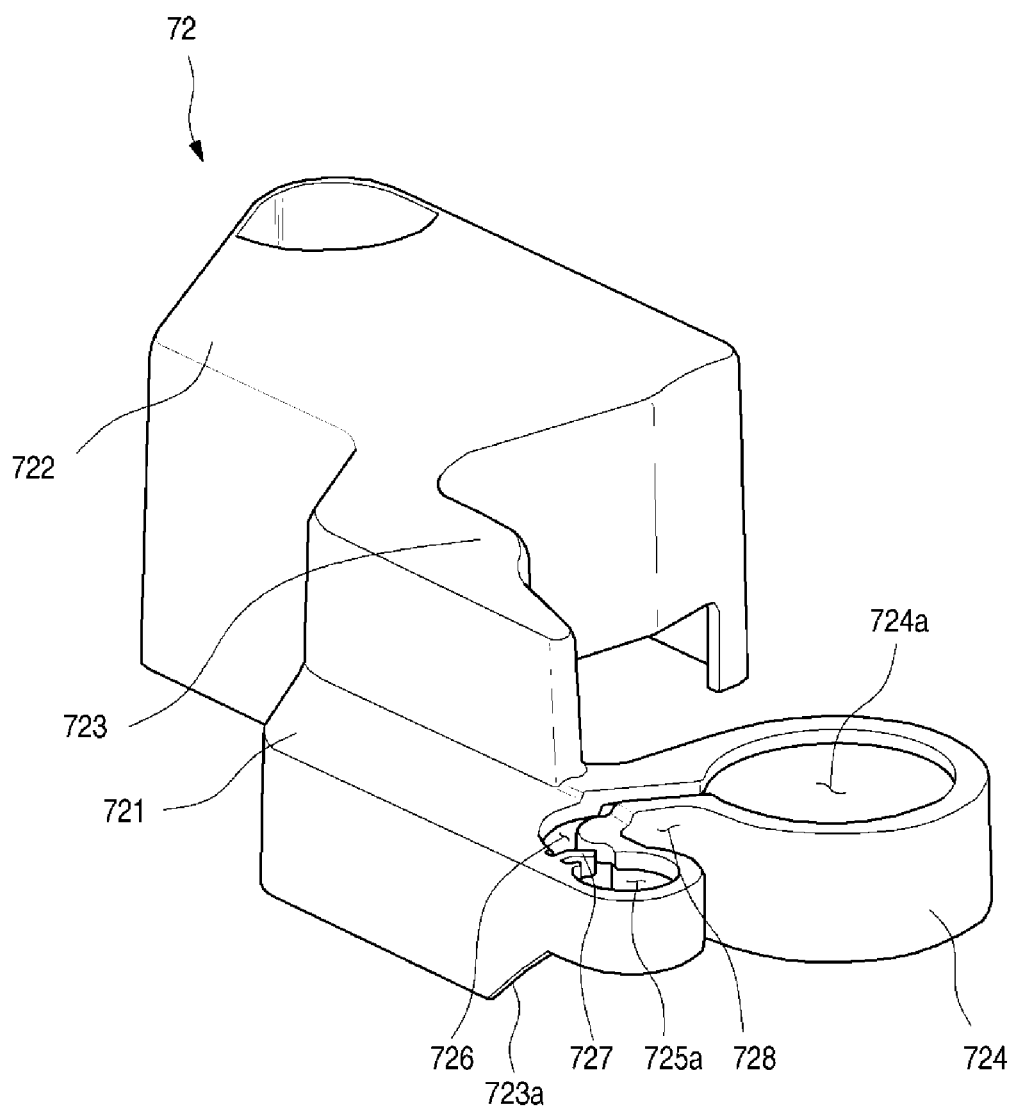
FIG. 15 is a perspective view illustrating the sub-hinge cover according to an embodiment of the present disclosure.
Figure 16:
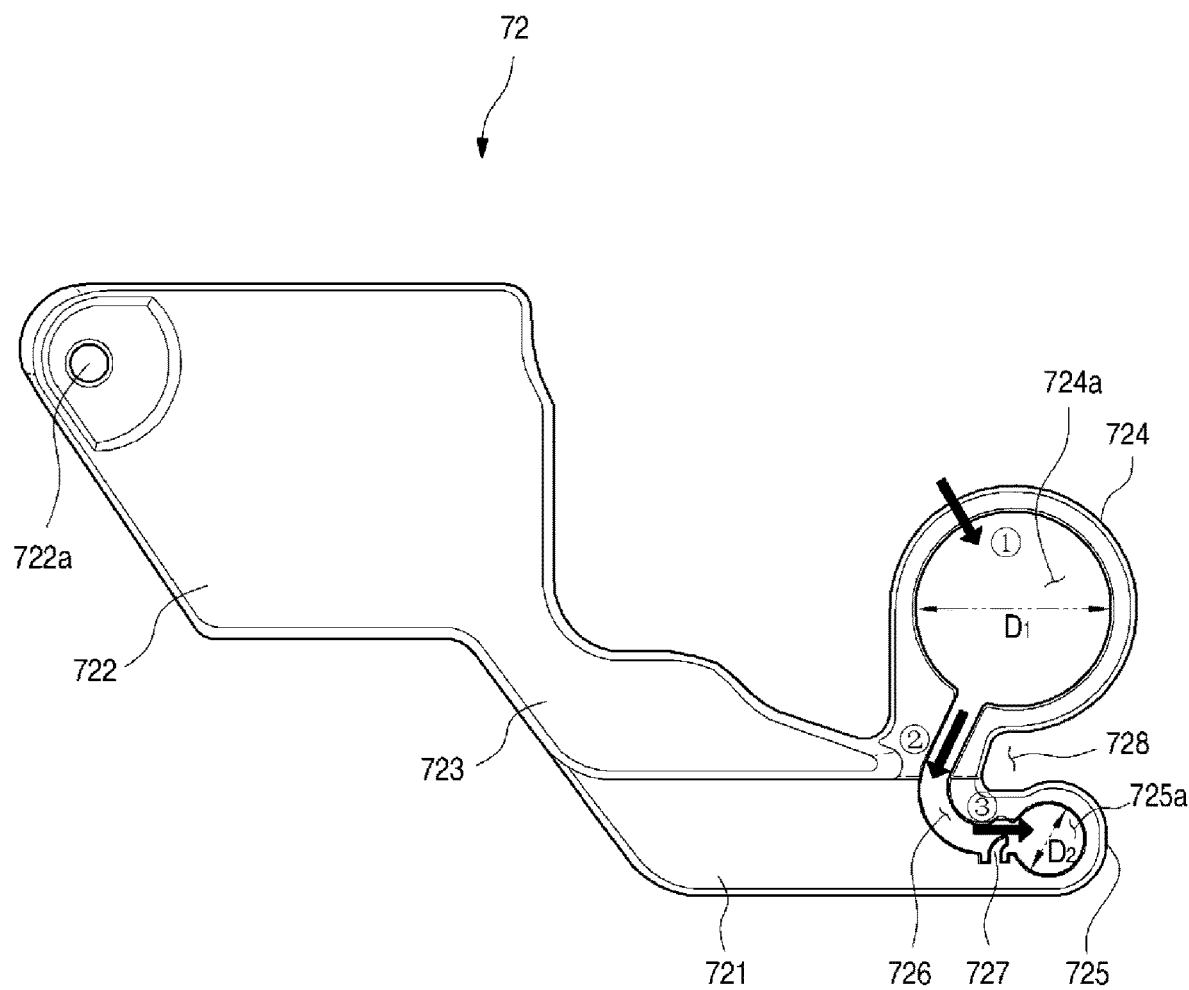
FIG. 16 is a plan view illustrating the sub-hinge cover.

FIG. 15 is a perspective view illustrating the sub-hinge cover according to an embodiment of the present disclosure, and FIG. 16 is a plan view illustrating the sub-hinge cover.

Although not illustrated in FIGS. 15 and 16, the entire portion of the bottom surface the sub-hinge cover 721 is open. Accordingly, the entire portion of the sub-hinge plate 71 is received and the wires 502, 503, 504, and 505 withdrawn from the sub-door 50 may be configured to be guided.

The sub-hinge cover 72 may mainly include a door mounting part 722 mounted in the main door 40, a cover extending part 723 extending from the door mounting part 722, and a shaft cover part placed on the sub-hinge shaft 711 and the main hinge shaft 811.

In more detail, the door mounting part 722, which allows the sub-hinge cover 72 to be fixedly mounted on the main door 40, has a screw hole 722a formed at one side of the door mounting part 722 for coupling with the screw such that the sub-hinge cover 72 is fixedly mounted on the upper end of the main door 40. The door mounting part 722 may be formed in the size to receive the sub-hinge plate 71 fixed to the upper end of the main door 40.

The cover extending part 723 is formed at one side of the door mounting part 722 to shield the sub-hinge plate 71 in the extending direction of the sub-hinge plate 71. The cover extending part 723 may be formed in the shape sufficient to place the cover extending part 713 in the space between the sub-cover 90 and the main hinge cover 82.

In addition, the cover mounting part 721 may be formed at one side of the cover extending part 7723. The cover mounting part 721 may be formed in the shape of making a step difference from the top surface of the cover extending part 723 and may be formed to be seated in the seating surface 95 of the sub-cover 90 in the state that the sub-door 50 is closed.

The sub-cover 90 may be mounted while being spaced apart from the bottom surface of the hinge mounting part 541. When the sub-door 50 is closed, the cover mounting part 721 may be inserted into the space between the floor of the hinge mounting part 541 and the bottom surface of the sub-cover 72.

In addition, the extending end portion of the cover extending part 723, that is, the bottom surfaces of the main shaft cover part 724 and the sub-shaft cover part 725 may have a cover step part 723a cut out to have the step structure upward. The cover step part 723a may be formed to have a step structure higher than the sub-hinge plate 71 to prevent the interference with the sub-hinge plate 71 when the sub-door is rotated.

A shaft cover part may be formed at the end portion of the cover extending part 723. The shaft cover part may include a sub-shaft cover part 725 placed at the upper portion of the sub-hinge cover 72 and a main shaft cover part 724 placed at the upper portion of the main hinge shaft 811. The sub-shaft cover part 725 may be referred to as a first cover part and the main shaft cover part 724 may be referred to as a second cover part.

The sub-shaft cover part 725 may be interposed between the sub-hinge shaft 711 and the extending end portion of the sub-cover 90. In addition, the sub-shaft cover part 725 may be formed to make contact with the top surface of the sub-hinge plate 71 and the bottom surface of the sub-cover 90. The sub-hinge cover 72, the sub-shaft cover part 725, and the end portion of the sub-cover 90 may be vertically aligned in a line and inner spaces thereof may communicate with each other.

In addition, the sub-shaft cover part 725 may be maintained at a fixed position together with the sub-hinge shaft when the sub-door is rotated, and has a structure of rotating together with the sub-hinge plate 71 when the main door 40 is rotated.

The wires 502, 503, 504, and 505 passing through the inner part of the sub-cover 90 may be introduced through a hollow part 725a of the sub-shaft cover part 725. The wire 501, which has passed through the sub-hinge shaft 711, may be guided along the sub-shaft cover part 725. Due to such a structure, the wires 502, 503, 504, and 505 may be guided while passing through the rotation center of the sub-door 50. Accordingly, the wires 502, 503, 504, and 505 may be guided to the main door 40 in the state that the length of the wires is not changed or moved even when the sub-door 50 is rotated.

The main shaft cover part 724 may be formed at the end portion of the cover extending part 723 and may be formed apart from the sub-shaft cover part 725. The main shaft cover part 724 has a hollow inner part. The size of the hollow 724a of the main shaft cover part 724 may be formed in the size corresponding to the size of the main hinge shaft 811.

The main shaft cover part 724 may be positioned at the upper portion of the main hinge shaft 811 and may be positioned at the lower portion of the main extending part 822 of the main hinge cover 82. In other words, the main shaft cover part 724 may be interposed between the main hinge shaft 811 and the main extending part 822, and the main shaft cover part 724 and the end portions of the main hinge shaft 811, and the main extending part 822 may be aligned in a line with each other. In addition, the main hinge shaft 811 and the inner parts of the main shaft cover part 724 and the main extending part 822 may communicate with each other. Accordingly, the wire 401 in the main door 40 extending to the outside through the main hinge shaft 811 may be guided into the main extending part 822 through the hollow 724*a* of the main shaft cover part 724. The wire 401 inside the main door 40 may include a wire connected with a door switch to sense the opening/closing of the sub-door 50, a wire connected with a main heater to prevent dew concentration on the outer surface of the main door 40 by heating the periphery of the main door 40, or wires connected with other electronic parts. The wires 401 passing through the main hinge shaft 724 may be called "second wire"

Meanwhile, the sub-shaft cover part 725 and the main shaft cover part 724 may be connected with each other through a cover connection part 726. The cover connection part 726, which connects a hollow 725*a* of the sub-shaft cover part 725 with a hollow 724*a* of the main shaft cover part 724, may be formed by cutting out one side of the cover extending part 723.

The width of the cut-out portion of a cover connection part 726 may be formed to have the intermediate value between the diameter of the hollow 725*a* of the sub-shaft cover part 725 and the diameter of the hollow 724*a* of the main shaft cover part 724. In addition, the diameter of the hollow 725*a* of the sub-shaft cover part 725 may be formed to be smaller than the diameter of the hollow 724*a* of the main shaft cover part 724.

The sub-door 50 may have a thickness thinner than the thickness of the main door 40 due to the structural characteristic of the sub-door 50. Accordingly, the diameter of the sub-hinge shaft 711 to support the sub-door 50 may be more reduced in proportion to the extent of restricting the diameter of the thickness of the sub-door 50. Due such a reason, all wires inside the sub-door 50 may not pass through the sub-hinge shaft 711 and some wires 502, 503, 504, and 505 pass through the wire entrance part 545.

However, the sub-door 50 and the main door 40 have structures open by rotation. The wires 501, 502, 503, 504, and 505 withdrawn from the sub-door 50 may be disposed to pass through the sub-hinge shaft 711 and the main hinge shaft 811. Accordingly, even when the sub-door 50 and the main door 40 are rotated, there is possible a structure in which the lengths of the wires are not changed and interference is not made.

Due to such a structure, the sub-hinge cover 72 may prevent the wires guided to the cabinet 10 through the sub-door 50 and the main door 40 from being exposed to the outside. Even if any one of the sub-door 50 and the main door 40 is rotated, the wires may be maintained to be shield by the sub-hinge cover 72.

Meanwhile, the wires 502, 503, 504, and 505 may have structures connected with a connector 506 to facilitate assembling and maintenance. The wires may be connected with each other through the coupling between the connectors 506 inside the main hinge cover 82 or the sub-hinge cover 72. When the wires 502, 503, 504, and 505 withdrawn through the wire entrance part 545 are connected with the connector 506, the width W1 of the connector 506 is greater than the diameter D1 of the hollow 725*a* of the sub-shaft cover part 725 and thus the connector 506 fails to pass through the hollow 725*a* of the sub-shaft cover part 725. Accordingly, the wires connected with the connector 506 may be inserted into the hollow 724*a* of the main shaft cover part 724 having a larger diameter and then may move the hollow 725*a* of the sub-shaft cover part 725 through the cut-out cover connection part 726.

In more detail, as illustrated in FIG. 16, the wires 502, 503, 504, and 505 are inserted through the hollow 724*a* of the main shaft cover part 724 before the sub-hinge cover 72 is assembled. In this case, the width W of the connector 506 connected with the wires may be smaller than the diameter D1 of the hollow 724*a* of the main shaft cover part 724 and may be greater than the diameter D2 of the hollow 725*a* of the sub-shaft cover part 725. The wires 502, 503, 504, and 505 inserted through the hollow 724*a* of the main shaft cover part 724 may be moved along the cut-out part of the cover connection part 726 and may be positioned inside the hollow 725*a* of the sub-shaft cover part 725.

The connector 506 of the wires 502, 503, 504, and 505 moved to the hollow 725*a* of the sub-shaft cover part 725 through the cover connection part 726 may be positioned inside the sub-hinge cover 72 and guided to the main hinge 80 or may be connected with another wire through the coupling between the connectors inside the sub-hinge cover 72.

A wire restriction part 727 may be further formed at the cut-out end portion of the cover connection part 726. The wire restriction part 727 may protrude adjacent to the sub-shaft cover part 725 and may extend to be inclined or rounded toward the sub-shaft cover part 725. Although the wires 502, 503, 504, and 505 are able to be moved to the hollow 725*a* of the sub-shaft cover part 725 via the wire restriction part 727 through the cut-out space of the cover connection part 726, the wires 502, 503, 504, and 505 may be restricted by the wire restriction part 727 when the wires 502, 503, 504, and 505 are moved toward the cover connection part 726 from the hollow 725*a* of the sub-shaft cover part 725. Accordingly, the wires 502, 503, 504, and 505 inserted into the hollow 725*a* of the sub-shaft cover part 725 may be maintained to be received in the hollow 725*a* of the sub-shaft cover part 725.

Meanwhile, the cover extending part 723 may be formed at an end portion thereof with a stopping part 728 recessed inwardly. The stopping part 728 may restrict the sub-door 50 as the sub-door 50 is inserted into the stopping part 728 and thus is not rotated any more when the sub-door 50 is rotated and open at a set angle. The stopping part 728 may be formed in a gap between the main shaft cover part 724 and the sub-shaft cover part 725. The stopping part 728 may be formed such that the side end of the sub-door 50 is inserted into the stopping part 728.

Figure 17:
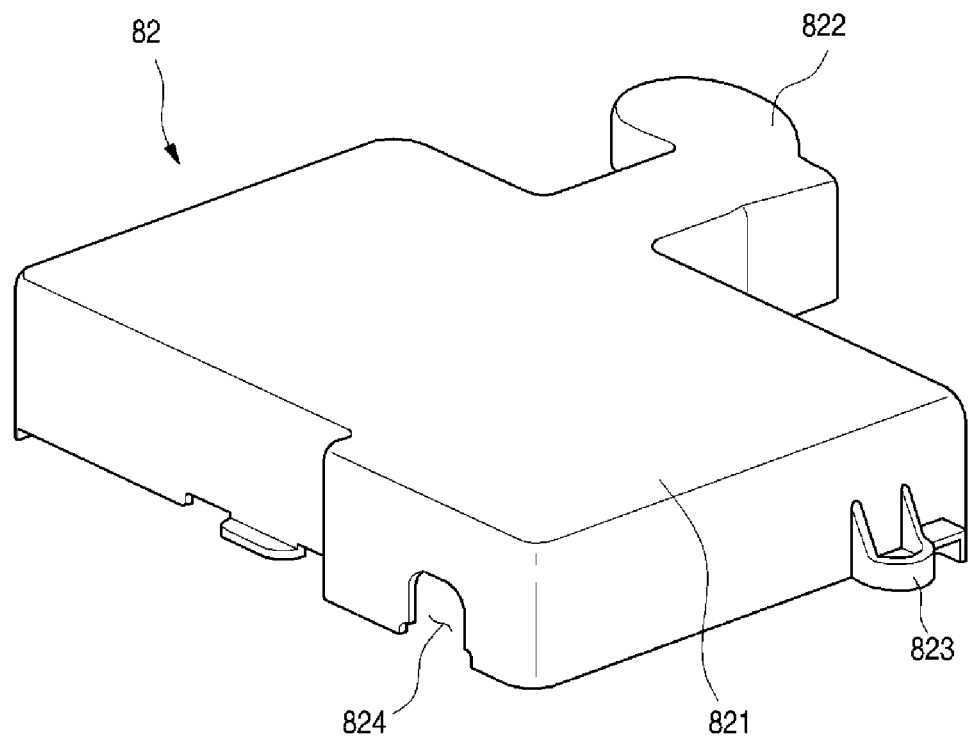
FIG. 17 is a perspective view of a main hinge cover, according to an embodiment of the present disclosure.
Figure 18:
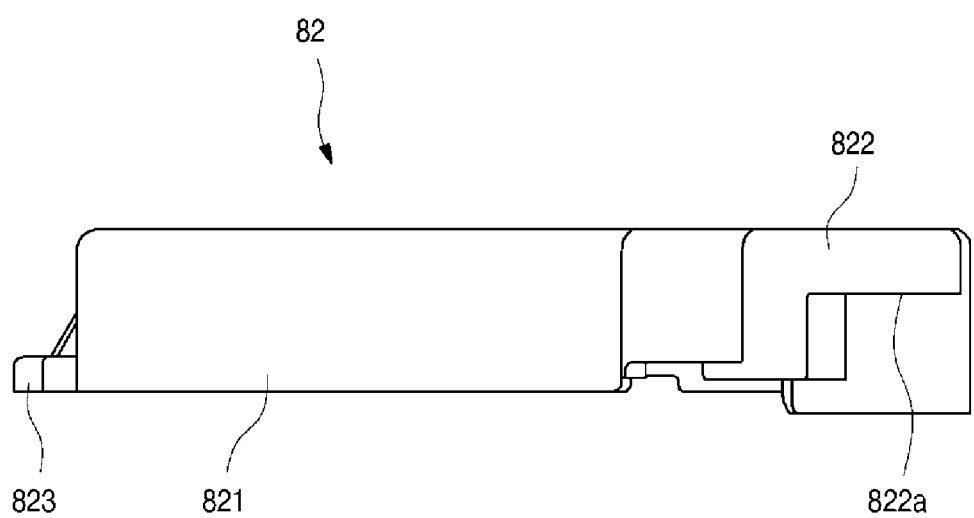
FIG. 18 is a front view of the main hinge cover.

FIG. 17 is a perspective view of a main hinge cover, according to an embodiment of the present disclosure. In addition, FIG. 18 is a front view of the main hinge cover.

Although not shown in drawings, the main hinge cover 82 is formed in the bottom surface thereof with an opening and formed to receive the main hinge plate 81 in the state that the main hinge cover 82 is mounted in the cabinet 10. The main hinge cover 82 may include a main mounting part 821 mounted in the cabinet 10 and a main extending part 822 extending from the main mounting part 821 toward the main hinge shaft 811.

The main mounting part 821 may be configured to receive the main hinge plate 81 and may receive wires withdrawn from the sub-door 50 and the main door 40 and connectors. In addition, the main mounting part 821 may be formed therein with a space to receive many elements such as a switch for sensing opening and closing of the main door 40, a sensor for measuring humidity, and a smart diagnostic PCB for remotely diagnosing the operation of the refrigerator.

A main cover fixing part 823 may be formed at the periphery of the main mounting part 821. A screw may be coupled to the main cover fixing part 823. The main hinge cover 82 may be fixed onto the cabinet 10 by the coupling of the screw. A cover opening 824 may be formed in one side of the rear surface of the main mounting part 821. The cover opening 824 may be open toward the control unit 14. Wires 401, 501, 502, 503, 504, and 505 guided into the main hinge cover 82 may be open toward the control unit 14 via the cover of the main hinge 80.

A connection cover 101 may be further interposed between the cover opening 824 and the control unit 14. The connection cover 101 may be formed such that the bottom surface is open. The wires 401, 501, 502, 503, 504, and 505 are received inside the connection cover 101 and thus the wires withdrawn from the main hinge cover 82 may be guided to the control unit 14. The wires may be prevented from being exposed to the outside and may directly connected with the control unit 14 without passing through the inner part of the cabinet 10, by the connection cover 101.

The main extending part 822 may be formed to extend along the main hinge plate 81 from the front end of the main mounting part 821. The main extending part 822 may be received in the main hinge plate 81 while extending to the main hinge shaft 811. The end portion of the main extending part 822 is positioned above the main hinge shaft 811. The main hinge shaft 811 and the end portions of the main shaft cover part 724 and the main extending part 822 are positioned on the same extending line and thus wires passing through the main hinge shaft 811 or the main shaft cover part 724 may be introduced into the main extending part 822.

Meanwhile, a main cover step part 822a may be formed with a step difference at an upper portion of the main extending part 822. The main cover step part 822a may position the main shaft cover part 724 of the sub-hinge cover 72 to be positioned therein. Accordingly, in the state that the main hinge cover 82 is mounted, even when the main door 40 is open or closed, the wires introduced into the main hinge cover 82 through the main shaft cover part 724 are prevented from being exposed to the outside.

The arrangement of wires withdrawn from the sub-door 50 in the refrigerator having the configuration according to an embodiment of the present disclosure will be described in more detail.

Figure 19:
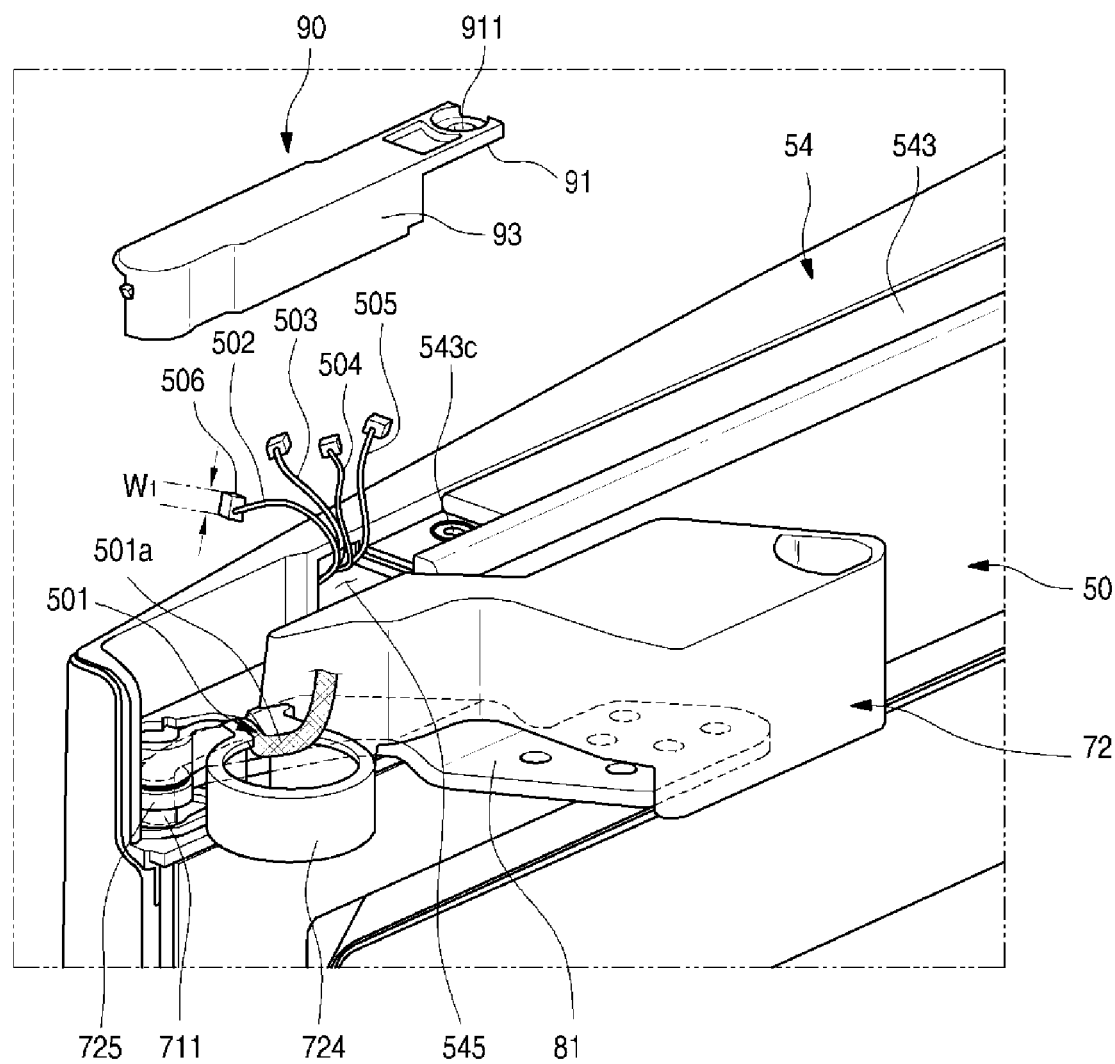
FIG. 19 is a perspective view illustrating a wire entrance structure of the sub-door.

FIG. 19 is a perspective view illustrating a wire entrance structure of the sub-door, and FIG. 20 is a sectional view taken along line 20-20' of FIG. 10.

Although illustrated in FIGS. 19 and 20, the display wire 501 among wires inside the sub-door 50 is guided from the inner part of the sub-door 50 to the outside of the sub-door 50 through the sub-hinge shaft 711.

In this case, the sub-hinge hole 544, in which the sub-hinge shaft 711 is mounted, may be formed in the upper cap decoration 54. The sub-hinge hole 544 may be formed in a hinge shaft bush 547 separately provided. The hinge shaft bush 547 may be mounted in the upper cap decoration 54 and the sub-hinge shaft 7111 may be inserted into the hinge shaft bush 547.

The display wire 501 guided upward through the sub-hinge shaft 711 may include about 30-40 strands of thin wires and may pass through the sub-hinge shaft 711, in the form of one bundle surrounded by a mesh-shaped protective member 501a. The display wire 501 may extend to the main shaft cover part 724 along the cover connection part 726 through the lower portion of the sub-shaft cover part 715 of the sub-hinge cover 72. In addition, the display wire 501 may upwardly pass through the hollow 724a of the main shaft cover part 724 and may be guided into the main hinge cover 82.

In other words, the display wire 501 passes through the rotation center of the sub-door 50 and the main door 40 which are rotated. Accordingly, when the sub-door 50 or the main door 40 is rotated, the display wire 501 may not be moved or the length of the display wire 501 is not changed. In addition, the display wire 501 may be prevented from being exposed to the outside and may be hidden when guided through the sub-hinge plate 71, the sub-hinge cover 72 and the main hinge cover 82 inside the sub-door 50. In particular, the display wire 501 may be covered by the sub-hinge cover 72 maintained in a fixing state even when the sub-door 50 and the main door 40 are open or closed. The display wire 50 may be prevented from interfered with the sub-door 50 and the main door 40.

The inner diameter of the sub-hinge cover 72 is less than the thickness of the sub-door 50. Accordingly, other wires 502, 503, 504, and 505 may not be introduced through the sub-hinge cover 72. Wires, such as the heater wire 502, the microphone wire 505 or the door light wire except for the display wire 501 among the wires inside the sub-door 50 may income or outcome through the wire entrance part 545 adjacent to the hinge mounting part 541.

The wires 502, 503, 504, and 505 withdrawn through the wire entrance part 545 may be guided toward the sub-hinge plate 71 along the inner space of the sub-cover 90. The wires may extend to the upper portion of the sub-shaft cover part 725 and may vertically pass through the hollow 725a of the sub-shaft cover part 725 to be guided into a lower space of the sub-hinge cover 72. In this case, since the wires are positioned at the upper portion of the sub-hinge shaft 711, even if the sub-door 50 is rotated, the lengths of the wires are not changed, the wires are not moved, and the arrangement state of the wires is maintained without change.

Meanwhile, the wires 502, 503, 504, and 505 may be guided to the main shaft cover part 724 along the cover connection part 726 inside the sub-hinge cover 72, similarly to the display wire 501. In addition, the wires may be guided into the main hinge cover 82 by vertically passing through the hollow 724a of the main shaft cover part 724. In other words, the wires may be moved along the sub-cover 90, the sub-hinge cover 72, and the main hinge cover 82. Accordingly, when the sub-door 50 is open or closed, the wires are not exposed to the outside and do not interfere with another element. In addition, as the wires are arranged to pass through the rotation center of the sub-door 50 and the rotation center of the main door 40, even if the sub-door 50 or the main door 40 is rotated, the wires may be maintained in a stationary arrangement structure without displacement.

Meanwhile, the wires 401 may be withdrawn out of the main hinge 80 through the main hinge shaft 811 and may be guided into the main hinge cover 82 through the hollow 724a of the main shaft cover part 724. At least one of the wires 401, 502, 503, 504, and 505 introduced into the main hinge cover 82 may be connected with wires connected with the control unit, which is provided in the main hinge cover 82, in a connector manner. At least some of wires inside the main hinge cover 82 may be guided toward the control u nit 14 through the cover opening 824 of the main hinge cover 82.

A connection cover 101 may be further provided between the cover opening 824 of the main hinge cover 82 and the control unit 14. The wires 401, 501, 502, 503, 504, and 505 may be connected with the control unit 14 without being exposed to the outside through the inner part of the connection cover 101 and 22.

The control unit 14 may be configured to control electrical components for selectively seeing through a see-through part 21 and outputting a screen as well as a cooling operation of the refrigerator 1. In addition, a main PCB 141, a display PCB 142, and an adaptor 143 may be provided in the control unit 14.

The freezing cycle and the overall operations of the refrigerator 1 may be controlled by the main PCB 141. The main PCB 141 may be connected with the display PCB 142 to receive the operation information of the transparent panel assembly 60.

The main PCB 141 may be connected with a camera to capture the inner part of the refrigerator and allow a user to utilize image information, and a microphone and a speaker to input and output a voice. The main PCB 141 may be connected with an additional communication module to communicate with an external device and a sub-device.

In addition, an adaptor 143 may be further provided in the control unit 14 to convert power supplied to the transparent panel assembly 60. DC power may be converted into AC power appropriate to the driving of the transparent panel assembly 60 by the adaptor 143. In addition, since the adaptor 143 has a larger size and represents higher heat emission, the adaptor 143 is placed in the control unit 14 on the cabinet 10 rather than the sub-door 50 for more efficient insulation and layout.

The transparent panel assembly 60 is placed in the internal space of the sub-door 50 and the outer space of the transparent panel assembly 60 may be narrowed due to the thinner thickness. Accordingly, to place the PCBs 602, 603, and 604 in the internal space of the sub-door 50, the minimum number of PCBs 602, 603, and 604 necessary for the driving of the electronic parts inside the transparent panel assembly 60 and the sub-door 50 are provided. In addition, remaining elements have to be arranged in the display PCB 142 on the top surface of the cabinet 10 and have a structure in which the PCBs 602, 603, and 604 and the display PCB are connected with each other by the wires. Accordingly, more effectively, the PCBs 602, 603, and 604 may be arranged at the upper end of the sub-door 50 connected with the display PCB 142 within the shortest distance.

As the PCBs 602, 603, and 604 are provided at the upper ends of the sub-door 50 such that the cables 601, 605, and 606 are upwardly guided along the periphery of the transparent panel assembly 60 and are easily connected with the PCBs 602, 603, and 604 at the upper ends of the sub-door 50. The PCBs 602, 603, and 604 for the driving of the electronic parts inside the transparent panel assembly 60 and the sub-door 50 are provided at the upper portion of the sub-door 50, thereby prevent the PCBs 602, 603, and 604 and the cables 601, 605, and 606 from being exposed through the transparent panel assembly 60 when viewed from the outside.

FIGS. 22 to 25 sequentially illustrate assembling structures of the hinge plate, the sub-hinge cover, the sub-cover, and the main hinge cover according to an embodiment of the present disclosure.

Figure 22:
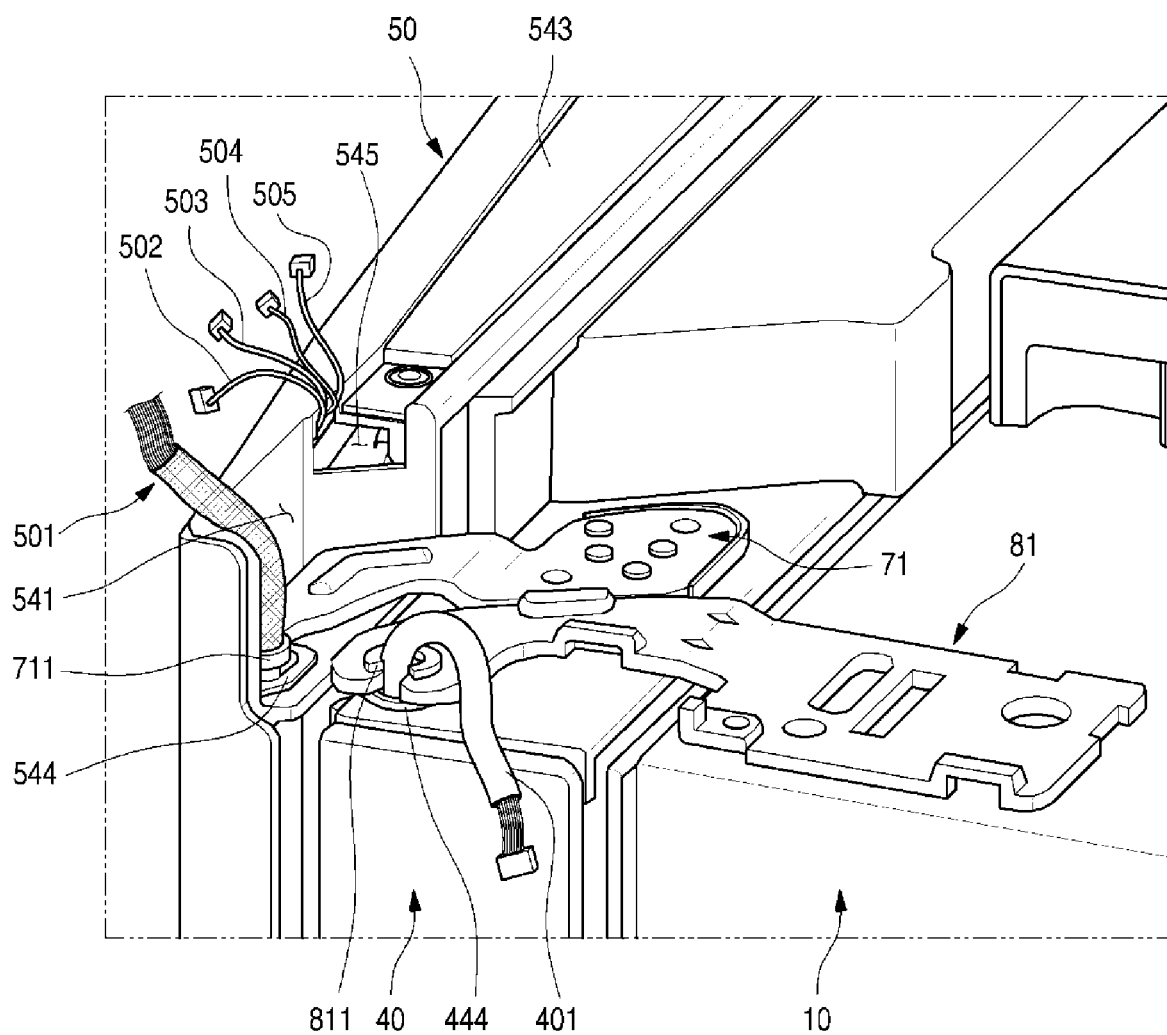
FIGS. 22 to 25 are views sequentially illustrating the assembling structure of a hinge plate, a sub-hinge cover, a sub-cover, and a main hinge cover, according to an embodiment of the present disclosure.

As illustrated in FIG. 22, the main door 40 is pivotably mounted on the cabinet 10 by the main hinge plate 81 mounted on the top surface of the cabinet 10. In addition, the sub-door 50 is pivotably mounted on the main door 40 by the sub hinge 70 mounted on the top surface of the main door 40.

In this case, the main hinge shaft 811 is inserted into a main hinge hole 444 of the main door 40 and the sub-hinge shaft 711 is inserted into a sub-hinge hole 544 of the sub-door. All of the main hinge shaft 811 and the sub-hinge shaft 711 have hollow structures. Accordingly, the wires are withdrawn out of the main door 40 and the sub-door 50 through the main hinge shaft 811 and the sub-hinge shaft 711.

The wire 401 withdrawn through the main hinge shaft 811 may include a wire for a door switch or a wire for a main door heater. In addition, the wire withdrawn through the sub-hinge shaft 711 may include the display wire 501. As the sub-hinge shaft 711 is restricted in diameter, all wires inside the sub-door may not income or outcome. To prevent noise, preferably, the display wire 501 may be independently withdrawn out of the sub-door 50 through the sub-hinge shaft 711.

Meanwhile, the wire entrance part 545 is open toward the hinge mounting part 541 in the state that the decoration cover 543 is mounted. In addition, the wires inside the sub-door 50, that is, the touch sensor wire 503, the heater wire 502, the ground wire 504, and the microphone wire 505 may be withdrawn out of the sub-door 50 through the wire entrance part 545.

Figure 23:
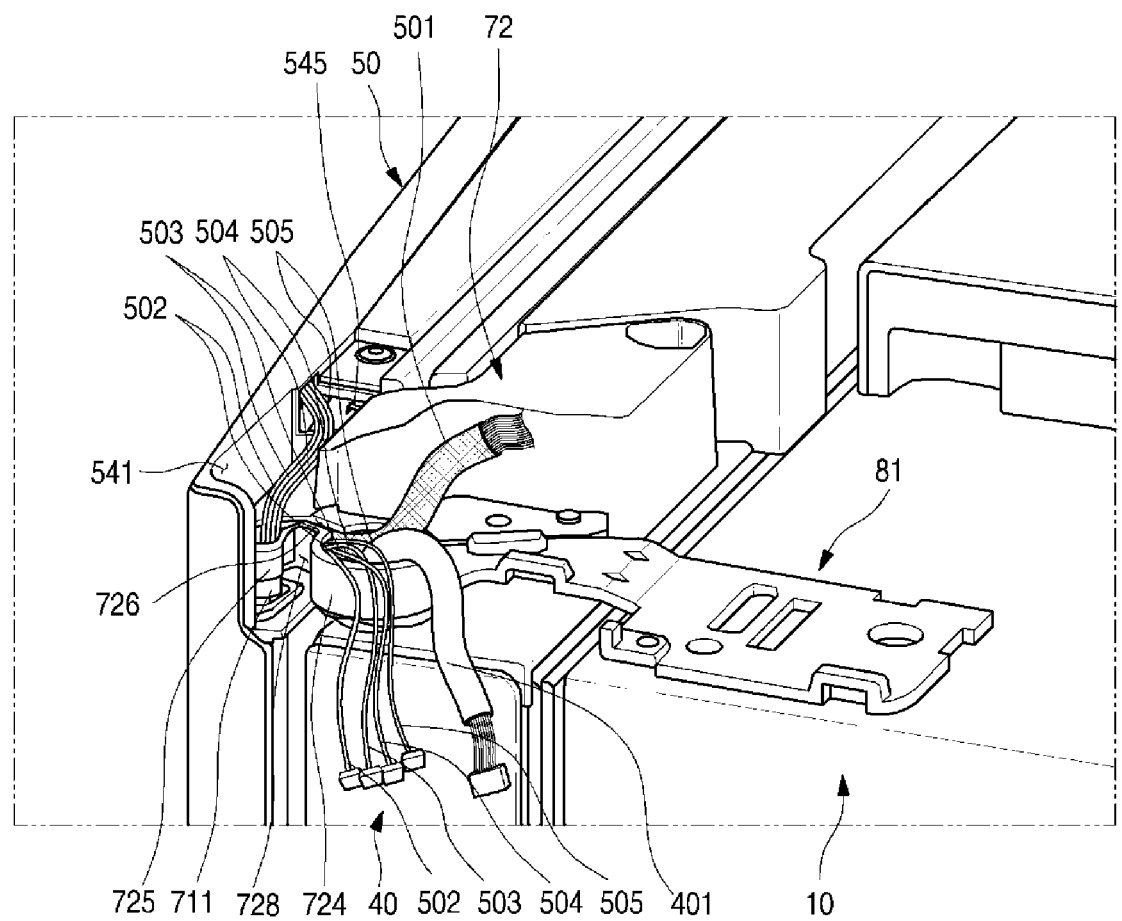

As illustrated in FIG. 23, in the state that the wires 502, 503, 504, and 505 are withdrawn out of the main hinge shaft 811, the sub-hinge shaft 711, and the wire entrance part 545, the sub-hinge cover 72 may be mounted. The sub-hinge cover 72 may be fixed mounted on the upper end of the sub-door 50. In this case, the sub-shaft cover part 725 of the sub-cover 90 may be positioned at an upper portion of the sub-hinge shaft 711 and the main shaft cover part 724 of the sub-cover 90 may be positioned at an upper portion of the main hinge shaft 811.

In this state, the wires 401 withdrawn through the main hinge shaft 811 are withdrawn upward through a hollow structure 724a of the main shaft cover part 724.

In addition, the display wire 501 withdrawn through the sub-hinge shaft 711 is withdrawn upwardly through a hollow structure 724a of the main shaft cover part 724 while passing through the sub-shaft cover part 725 of the sub-hinge cover 72 and the inner part of the cover connection part 726. In this case, the display wire 501 may be moved along the inside of the sub-hinge cover 72 and covered by the sub-hinge cover 72.

In addition, the wires 502, 503, 504, and 505 withdrawn through the wire entrance part 545 may be exposed to the inside of the hinge mounting part 541.

Figure 24:
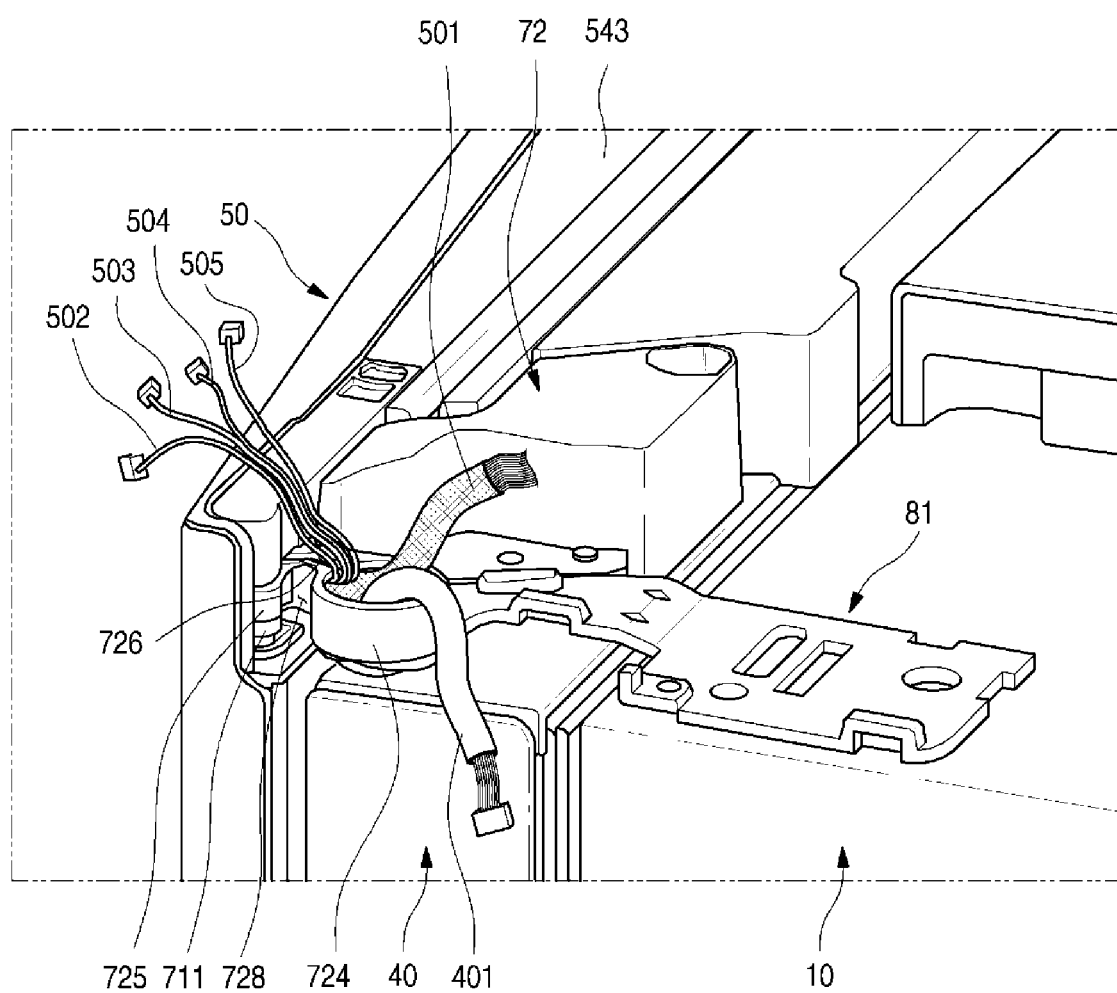

As illustrated in FIG. 24, the sub-cover 90 is mounted in the hinge mounting part 541. The sub-cover 90 is disposed to cross the hinge mounting part 541 and may extend to the end portion of the hinge mounting part 541 facing the wire entrance part 545.

The wire entrance part 545 may be shielded by the sub-cover 90. The wires withdrawn from the wire entrance part 545 through the inside of the sub-cover 90 may be guided as illustrated in FIG. 20.

The sub-cover 90 and the decoration cover 545 may be fixed to the upper decoration 54 by the coupling member 92 coupled to the sub-cover 90. In addition, even when the sub-door 50 is rotated, the sub-cover 90 is maintained in a fixed state.

The wires 502, 503, 504, and 505 guided along the sub-cover 90 may be inserted into the hollow 725a of the sub-shaft cover part 725 positioned at a lower portion of the end portion of the sub-cover 90. The wires inserted into the upper portion of the hollow structure 725*a* may be guided along the sub-hinge cover 72. The wires inside the sub-hinge cover 72 may be withdrawn upward through the hollow structure 724*a* of the main shaft cover part 724.

In addition, when the wires 502, 503, 504, and 505 have a structure connected with the connector 506, the wires inside the main door 40 may be coupled to the connector inside the sub-cover 90. In this case, the wires 502, 503, 504, and 505 withdrawn out of the wire entrance part 545 may have a structure connected with wires passing through the main hinge shaft 811 from the main door 40.

As described above, the wires of the sub-door 50 passes through the sub-shaft cover part 725 positioned at the upper portion of the rotation center of the sub-door 50 and the main shaft cover part 724 positioned at the upper portion of the rotation center of the main door 40. In addition, the wires 401 of the main door 40 may be guided to the outside through the main shaft cover part 724 positioned at the upper portion of the rotation center of the main door 40.

Figure 25:
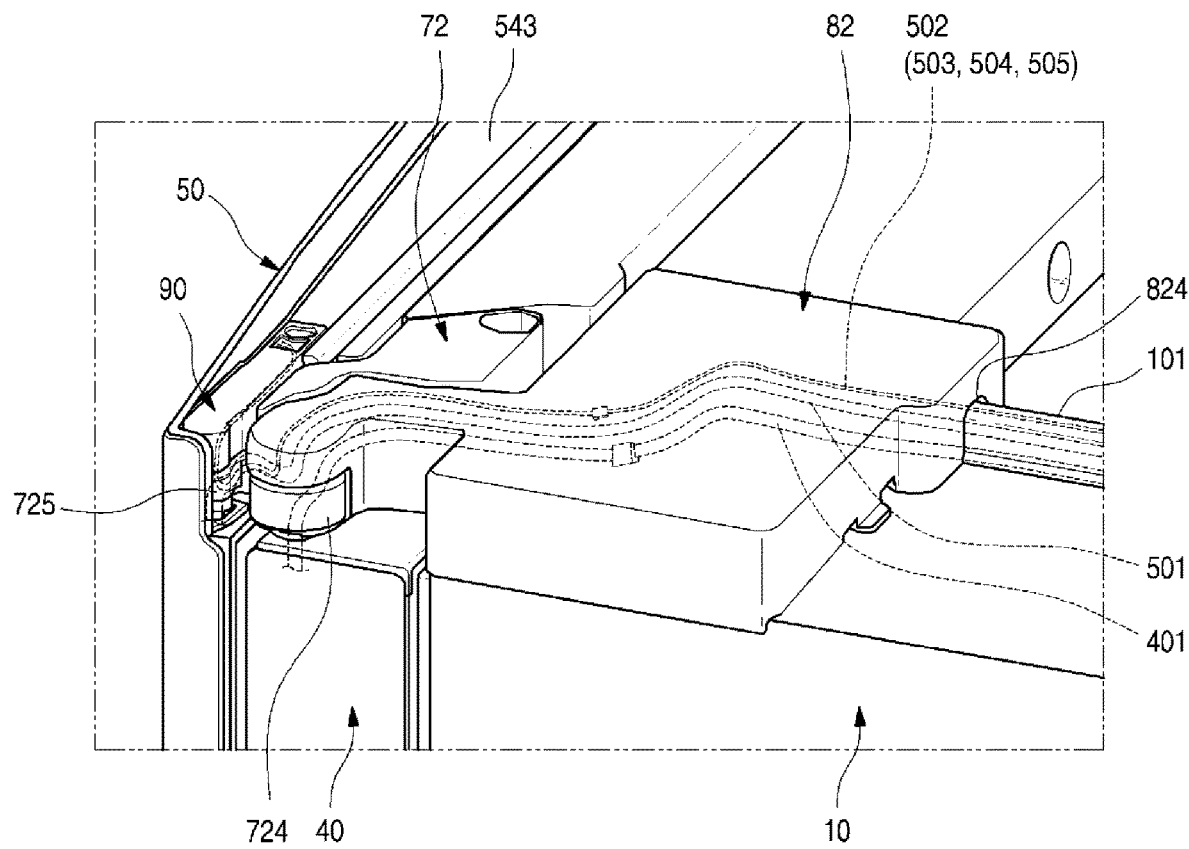

As illustrated in FIG. 25, the main hinge cover 82 may be mounted on the top surface of the cabinet 10. As the main hinge cover 82 is mounted, the entire portion of the main hinge plate 81 and the main shaft cover part 724 are shielded. Accordingly, the wires 401, 501, 502, 503, 504, and 505 withdrawn through the main shaft cover part 724 may be shielded inside the main hinge cover 82.

If necessary, some of the wires may be connected by the connector 506 inside the main hinge cover 82.

In addition, the wires 401, 501, 502, 503, 504, and 505 guided to the inside of the main hinge cover 82 may be guided to the outside of the main hinge cover 82 through the cover opening 824. In this case, the cover opening 824 of the main hinge cover 82 may be connected with the control unit 14 by the connection cover 101. In addition, the wires may be guided to the inside of the control unit 14 through the inner part of the connection cover 101 and may be connected with the display PCB 142 or the main PCB 141.

As described above, as the sub-hinge cover 72, the sub-cover 90, and the main hinge cover 82 are sequentially mounted and the wires are placed, the wires withdrawn from the sub-door 50 and the main door 40 may be completely shielded.

In particular, even when the storage space is open or closed by the rotation of the sub-door 50 and the main door 40, the wires are not exposed to the outside and do not interfere with another element.

Hereinafter, the state that the sub-door and the main door of the refrigerator according to an embodiment of the present disclosure are open will be described.

Figure 26:
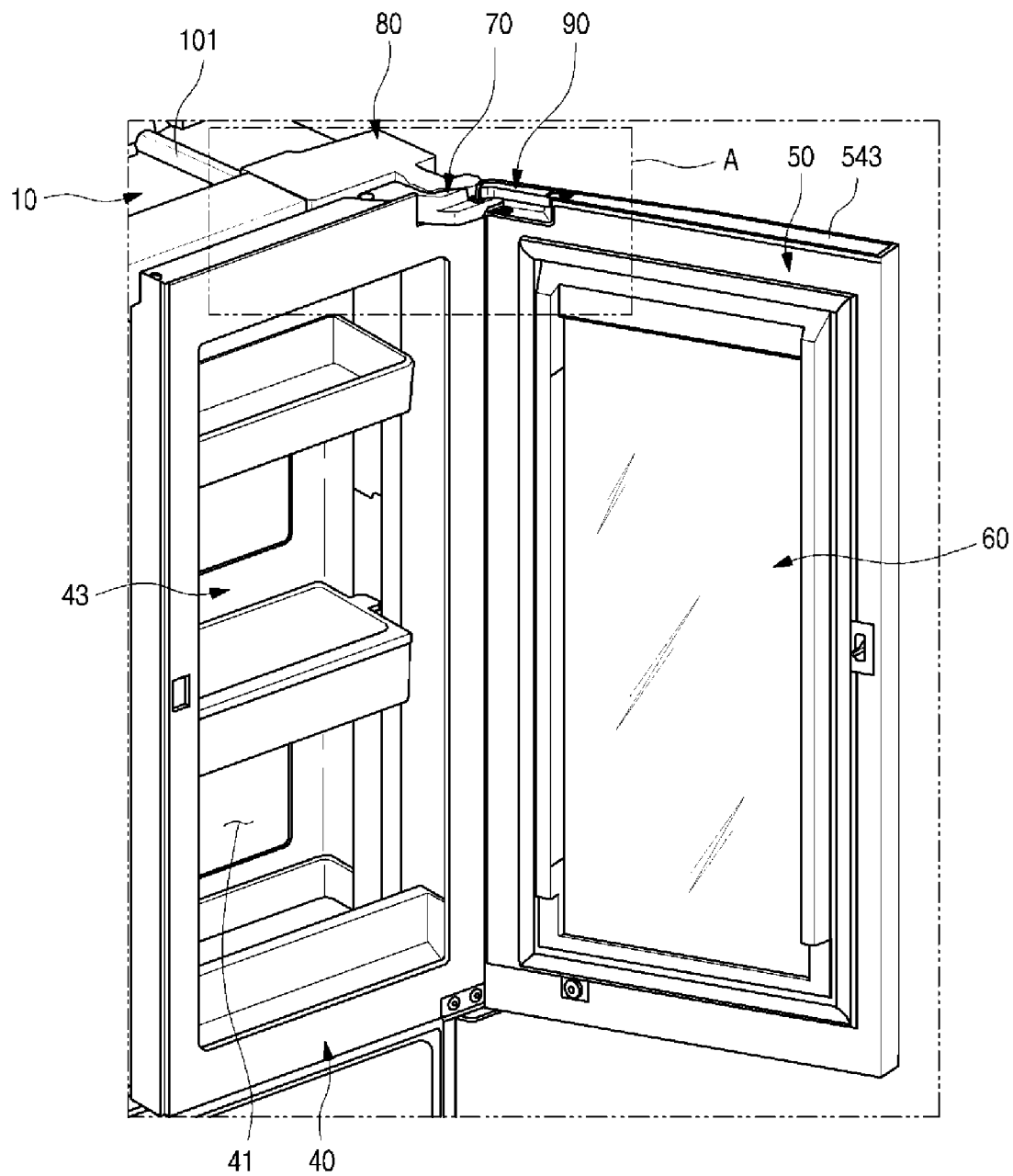
FIG. 26 is a perspective view that the sub-door is open.
Figure 27:
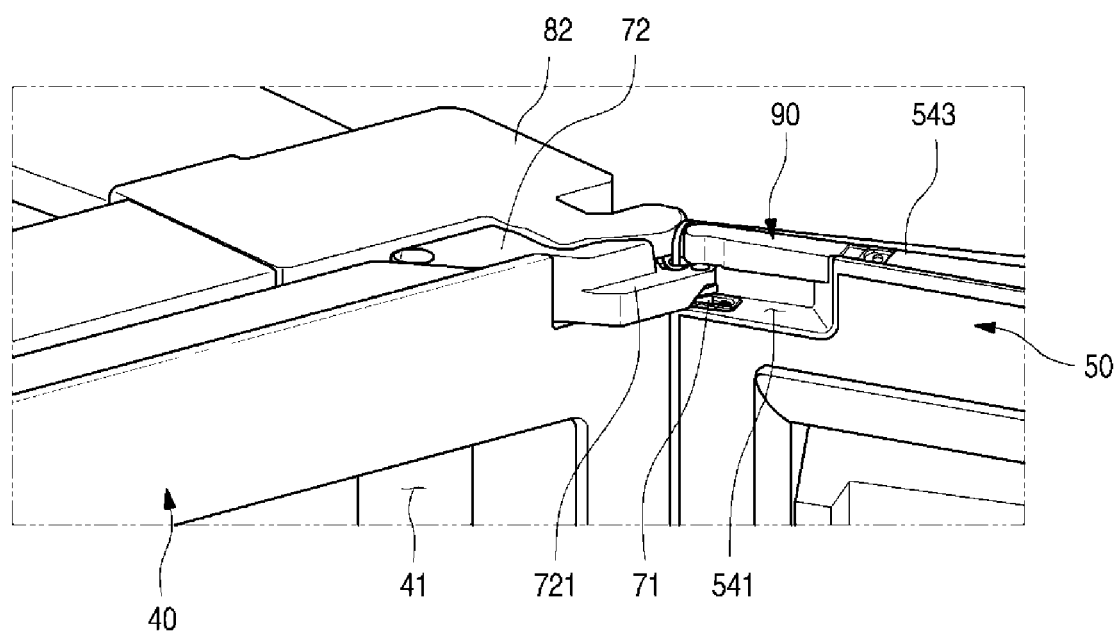
FIG. 27 is an enlarged view of part A of FIG. 26.
Figure 28:
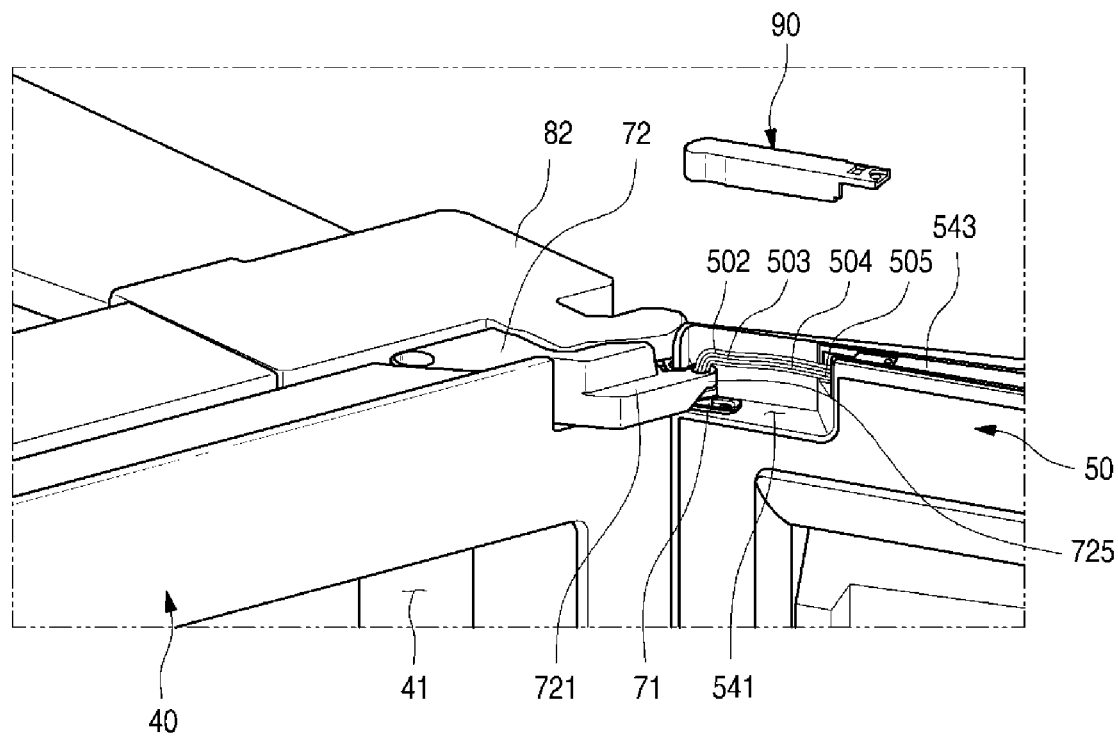
FIG. 28 is a view that the sub-cover of FIG. 27 is separated from the refrigerator.
Figure 29:
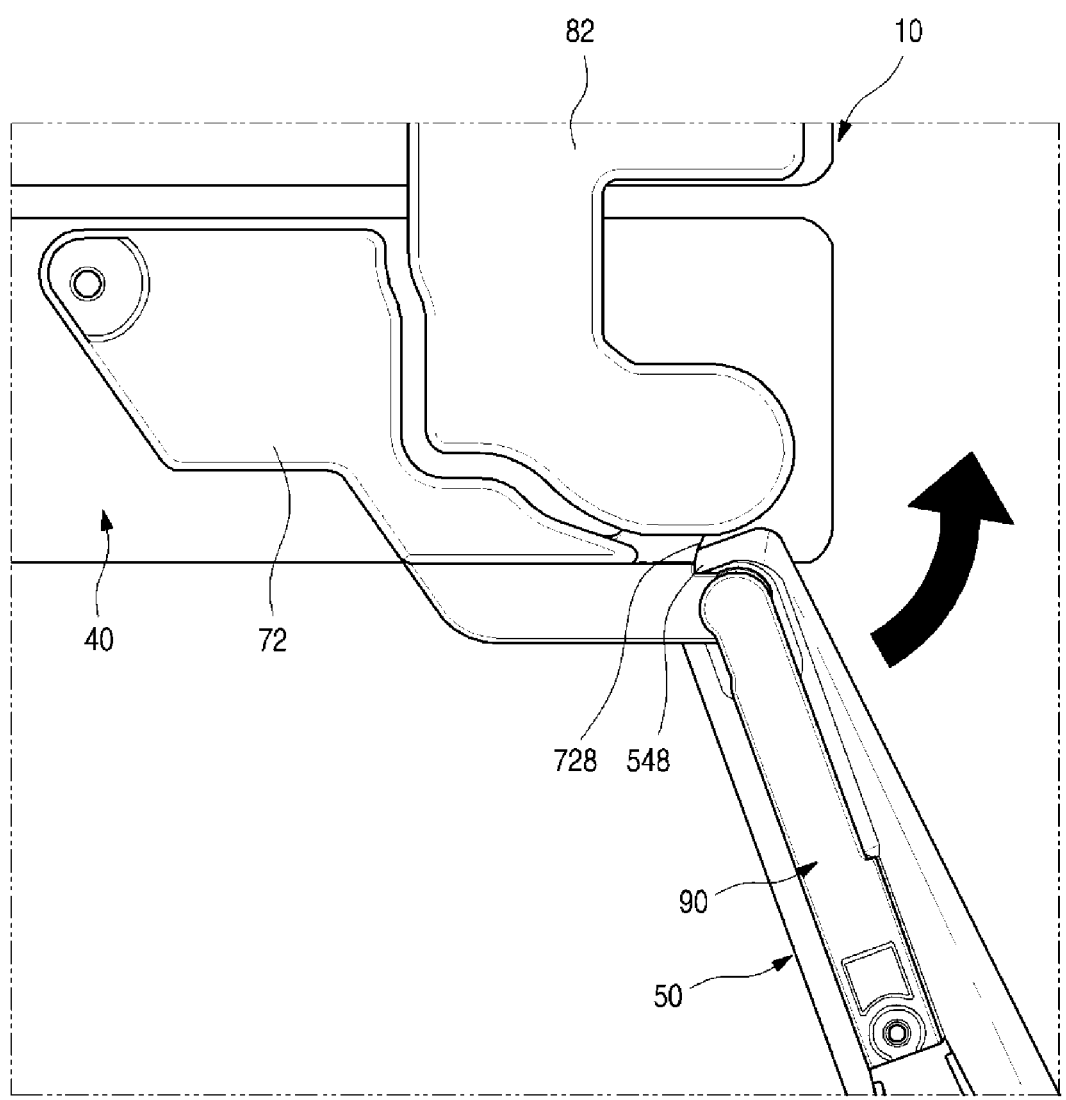
FIG. 29 is a partial plan view illustrating that the sub-door is open.

FIG. 26 is a perspective view that the sub-door is open. FIG. 27 is an enlarged view of part A of FIG. 26. FIG. 28 is a view that the sub-cover of FIG. 27 is separated from the refrigerator. FIG. 29 is a partial plan view illustrating that the sub-door is open.

As illustrated in drawings, the upper end of the sub-door 50 is pivotably supported by the sub-hinge 70. The sub-door 50 may be rotated as illustrated in FIG. 26 by the manipulation of the open device of a user. As the sub-door 50 is rotated, the opening 41 of the main door 40 may be exposed. As the sub-door 50 is open, the receiving space of the main door 40, that is, the receiving case 43 may be exposed and the user may receive foods into the receiving case 43.

In the state that the sub-door 50 is open, the rear surface of the sub-door 50 may be exposed. The sub-cover 90 mounted in the sub-door 50 may be rotated together with the sub-door 50 in the state that the sub-cover 90 is mounted in the sub-door 50. The wires 502, 503, 504, and 505 withdrawn from the sub-door 50 may be completely shielded by the sub-cover 90 and the sub-hinge cover 72 as illustrated in FIG. 27.

In detail, since the wire 51 withdrawn through the sub-hinge cover 72 moves along the inside of the sub-hinge cover 72, the wire 51 is shielded by the sub-hinge cover 72 and thus is not exposed to the outside.

In addition, other wires 502, 503, 504, and 505 inside the sub-door 50 may be withdraw to the outside of the sub-door 50 through the wire entrance part 545. In this case, the wires are shielded by the sub-cover 90 and are introduced into the sub-hinge cover 72 through the sub-shaft cover part 725. Accordingly, the wires are not exposed to the outside even in the state that the sub-door 50 is in an open state or is being opened as illustrated in FIG. 26.

Meanwhile, the sub-door 50 may be open by a present angle, and the open degree of the sub-door 50 may be restricted by the stopping part 728. The rotation angel of the sub-door 50 may be 90° or more about the front surface of the main door 40 to facilitate the access to the receiving case 43 and may be 180° or less such that the sub-door 50 is closed after the foods are received in the receiving case 43.

In detail, in the state that the sub-door 50 is rotated, the sub-hinge cover 72 is maintained in a fixing state together with the main door 40. In addition, when the sub-door 50 is rotated at a set angle or more, the side end portion of the sub-door 50 may be inserted into the stopping part 728 recessed from the end portion of the sub-hinge cover 72.

In this case, the side end portion of the sub-door 50 may correspond to one side end portion of the upper end of the sub-door 50 in which the hinge mounting part 541 is formed. In addition, the side end portion of the sub-door 50 may be adjacent to the end portion of the sub-cover 90 and an out-case 51 forming an outer surface of the sub-door 50 may correspond to the bending portion.

When the sub-door 50 is rotated about the sub-hinge cover 72, the side end portion of the sub-door 50 may be inserted into the space recessed in the stopping part 728. In addition, if the sub-door 50 is rotated by a set angle, the side end portion of the sub-door 50 makes contact with the stopping part 728 as illustrated in FIG. 28 and the sub-door 50 is restricted such that the sub-door 50 is not rotated any more.

The stopping part 728, which provides the space between the sub-shaft cover part 725 and the main shaft cover part 724 of the sub-hinge cover 72, may restrict the side end portion of the sub-door 50 into the space between the sub-shaft cover part 725 and the main shaft cover part 724.

Figure 30:
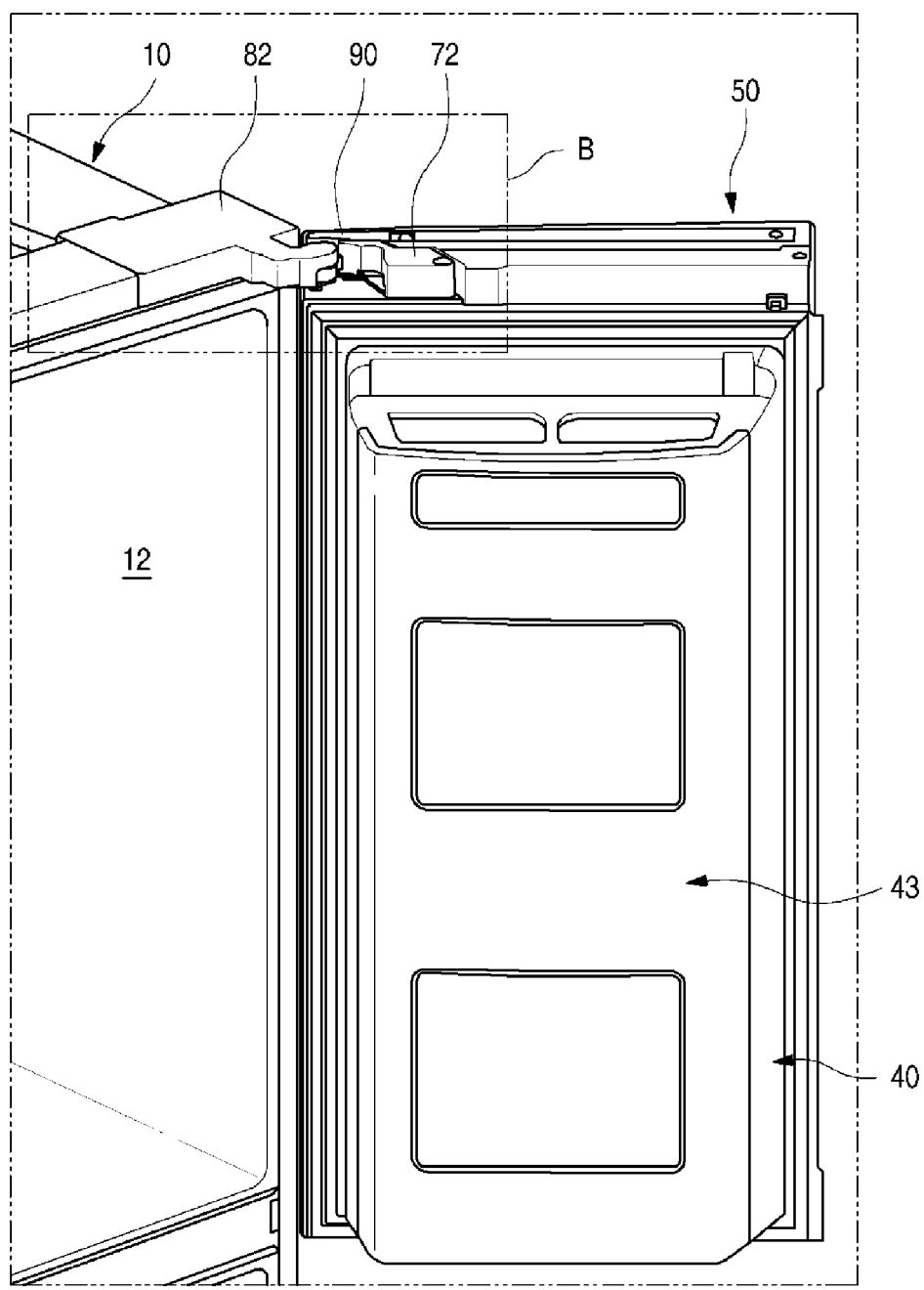
FIG. 30 is a perspective view of the main door that is open.
Figure 31:
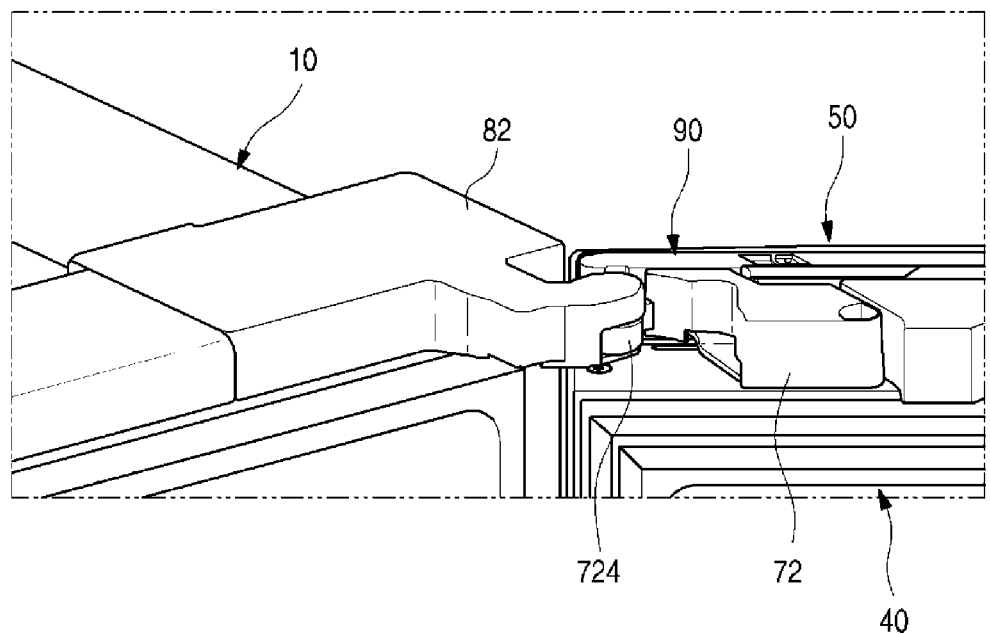
FIG. 31 is an enlarged view of part B of FIG. 30.
Figure 32:
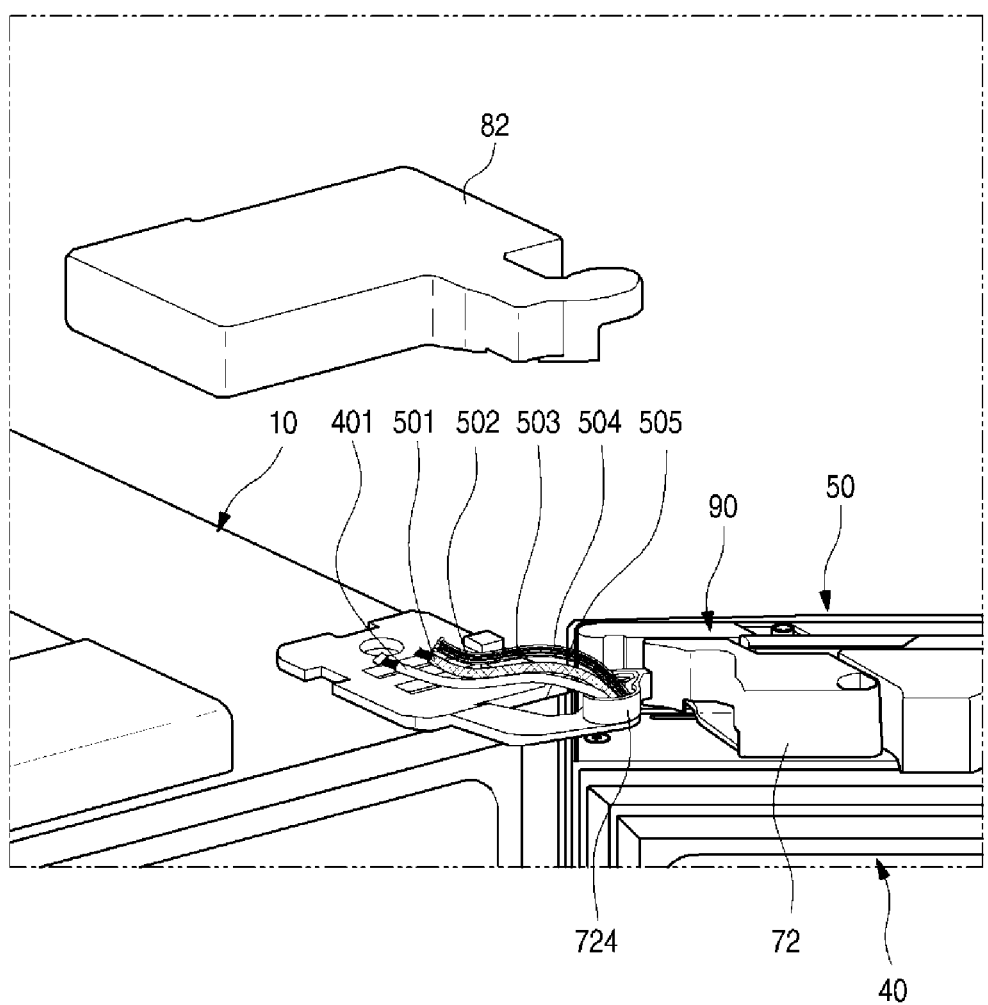
FIG. 32 is a view illustrating that the main hinge cover of FIG. 31 is separated.

FIG. 30 is a perspective view of the main door that is open. FIG. 31 is an enlarged view of part B of FIG. 30. FIG. 32 is a view illustrating that the main hinge cover of FIG. 31 is separated.

As illustrated in drawings, in the state that the sub-door 50 is closed, the user may open the main door 40 while holding the main door 40 with one hand of the user. It is preferred that the main door 40 is open in the state that the sub-door 50 is closed, the main door 40 is rotated in the state that the sub-door 50 is open.

As the main door 40 is rotated, the main door 40 is rotated about the main hinge shaft 811. In addition, the internal storage space of the cabinet 10 is open by the rotation of the main door 40 and thus foods may be received as illustrated in FIG. 29. In addition, the rear surface of the receiving case 43 of forming an additional storage space provided by the main door 40 may be exposed and the user may receive foods in the storage space provided by the main door 40 even through the rear surface of the receiving case 43.

Meanwhile, in the state that the main door 40 is open, the sub-hinge cover 72 mounted in the main door 40 is rotated together. In addition, since the main door 40 and the sub-door 50 are rotated together, the sub-cover 90 is rotated together.

In this state, the wires 401, 501, 502, 503, 504, and 505 inside the main door 40 and the sub-door 50 may be introduced into the main extending part 822 of the main hinge cover 82 through the main shaft cover part 724 of the sub-hinge cover 72. An end portion of the main extending part 822 may be aligned in a line the main shaft cover part 724, and the main shaft cover part 724 may be shielded by the main extending part 822. The wires passing through the main shaft cover part 724 may be shielded by the main hinge cover 82 and may be guided through the inside of the main hinge cover 82.

Accordingly, as illustrated in FIG. 30, in the state that the main door 40 is in an open state or is being opened, the wires withdrawn from the sub-door 50 and the main door 40 are shielded by the sub-hinge cover 72 and the main hinge cover 82, are not exposed to the outside, and does not interfere with another element.

The embodiment of the present disclosure is to provide a refrigerator capable of preventing an electric wire, which extends from a door toward a main body, from being exposed to the outside.

The embodiment of the present disclosure is to provide a refrigerator capable of preventing an electric wire, which extends from a door toward a main body, from interfering with another element or being damaged.

The embodiment of the present disclosure is to provide a refrigerator capable of shielding and guiding an electric wire which extends from a main door to a sub-door.

The embodiment of the present disclosure is to provide a refrigerator capable of guiding an electric wire extending from a door restricting the thickness of the electric wire toward a main body without being exposed to the outside or interfering with the opening of the door.

According to an embodiment, a refrigerator includes a cabinet; a control unit that is provided in the cabinet and controls an operation of the refrigerator; a main door that opens or closes the cabinet and has an opening formed therein; a main hinge that couples the cabinet to the main door and allows the main door to be pivotably mounted; a sub-door that is formed on a front surface of the refrigerator and opens or closes the opening; a sub-hinge that couples the main door to the sub-door and allows the sub-door to be pivotably mounted; a sub hinge cover that simultaneously shield a main hinge shaft of the main hinge and a sub-hinge shaft of the sub-hinge; and a wire disposed to extend from an inside of the sub-door, to be connected with the control unit, and to sequentially pass through the sub-hinge shaft and the main hinge shaft along an inside of the sub-hinge cover.

The sub-hinge cover may be fixedly mounted on the main door and may be provided in one surface thereof with an opening to receive the sub-hinge in the sub-hinge cover The sub-hinge cover may include a main shaft cover part that shields an upper portion of the main hinge shaft and has a hollow structure aligned in a line with the main hinge shaft, and a sub-shaft cover part that shields an upper portion of the sub-hinge shaft and has a hollow structure aligned in a line with the sub-hinge shaft.

The refrigerator of claim 3 may further include a cover connection part interposed between the main shaft cover part and the sub-shaft cover part to couple the main shaft cover part to the sub-shaft cover part.

The cover connection part may be cut out such that the wire passes through the cover connection part, and a wire restriction part may be formed inside the cover connection part to protrude toward the sub-shaft cover part and to allow the wire to restrict a wire provided inside the sub-shaft cover part.

The wire may have a connector for coupling. A diameter of a hollow structure of the sub-shaft cover part may be less than a width of the connector, and a diameter of a hollow structure of the main shaft cover part is greater than a width of the connector. The wire may be inserted into the hollow structure of the main shaft cover part, may be moved along the cover connection part, and may be positioned in the hollow structure of the sub-shaft cover part.

The wire may include a first wire withdrawn out of the inside of the sub-door through the sub-hinge shaft, and a second wire withdrawn out of the inside of the main door through the main hinge shaft. The first wire and the second wire may extend toward the control unit through the hollow structure of the main shaft cover part.

A hinge mounting part having the sub-hinge shaft may be formed in the sub-door, and the hinge mounting part may be formed at one side thereof with a wire entrance part having an opening allowing a third wire inside the sub-door to be withdrawn out of the hinge mounting part.

A sub-cover may be provided in the hinge mounting part and receives the third wire extending from the wire entrance part to the sub-shaft cover part.

The sub-hinge shaft, the sub-shaft cover part, and the sub-cover may be aligned in a line in an up-down direction and communicate with each other.

The third wire guided by the sub-cover may be introduced into the hinge cover through the hollow structure of the sub-shaft cover part and may extend toward the control unit through the hollow structure of the main shaft cover part.

The cabinet may include a main hinge cover to shield an upper portion of the main shaft cover part, and the main hinge shaft, the main shaft cover part, and the main hinge cover may be aligned in a line and communicate with each other.

The cabinet may be provided on a top surface thereof with a connection cover to receive the wire and to connect the main hinge cover with the control unit.

The sub-door may include a transparent panel assembly to selectively visualize an inside of the opening. The transparent panel assembly may include a display to output an image.

The wire may be a wire for the display to perform signal processing of the display, and the wire for the display may pass through the sub-hinge shaft.

The third wire may include remaining wires that are provided inside the sub-door except for the wire for the display and are guided to an outside through the wire entrance part.

The third wire may be at least one of a touch sensor wire connected with a touch sensor to sense a touch of the transparent panel assembly, a ground wire to prevent static electricity when the transparent panel assembly is touched, a heater wire connected with a heater to prevent dew from being concentrated on a front surface of the sub-door, and a microphone wire connected with a microphone for a voice input of a user.

The sub-door may be formed on an upper end thereof with a decoration opening communicating with a space of an upper portion of the transparent panel assembly. Printed circuit boards may be provided in an inner part of the decoration opening to control the transparent panel assembly. The inner part of the decoration opening may communicate with the wire entrance part.

A topping part may be recessed inwardly between the main shaft cover part and the sub-shaft cover part. A side end portion of the sub-door may be inserted into the stopping part to restrict an opening of the sub-door, when an opening degree of the sub-door is maximized.

According to an embodiment of the present disclosure, a refrigerator may include a cabinet having a storage space, a door that opens or closes the storage space, a hinge that pivotably couples the cabinet to a door and is coupled to a hinge mounting part recessed in the door by a hinge shaft, a hinge cover that shields the hinge and receives the hinge shaft, a first wire withdrawn out of an inside of the sub-door through the hinge shaft, a wire entrance part that has an opening formed in the hinge mounting part and allows a second wire inside the sub-door to be withdrawn out of the hinge mounting part, and a sub-cover that guides a wire, which extends from the wire entrance part to the sub-shaft cover part to pass through the wire entrance part, toward the hinge cover.

As described above, according to the embodiment, the refrigerator has the following effects.

In the refrigerator according to an embodiment of the present disclosure, the wires provided inside the sub-door passes through the inside of the hinge cover which shields both the hinge shafts of the sub-door and the main door. Accordingly, when the sub-door or the main door is open, the wires are not exposed to the outside.

In addition, the wires sequentially pass through the hinge shafts of the sub-door and the main door toward the cabinet. Even when the sub-door or the main door is rotated, the wires may be prevented from being changed in a length or moved as wires are pulled or pushed. Accordingly, the interference of the wires or the damage to the wires may be prevented, so the durability of the wires may be improved.

In addition, the sub-hinge cover includes the main shaft cover part and the sub-shaft cover part, which shield the hinge shaft of the main door and the hinge shaft of the sub-door. The cover connection part is formed to move the wires from the main shaft cover part to the sub-shaft cover part. Accordingly, the wires withdrawn from the sub-door and the main door are guided to pass through the respective hinge shafts by using one member (the sub-hinge cover). Accordingly, the workability and the productivity may be improved.

In addition, some of the wires connected with a plurality of electronic parts provided inside the sub-door may be withdrawn through the hinge shaft of the sub-door. The remaining portion of the wires may be withdrawn to the outside through the additional wire entrance part formed in the door. The guide of the wires passing through the sub-door and the hinge shaft of the sub-door, which are restricted in thickness, is possible.

In particular, only the display wire for transmitting a signal to the display passes through the hinge shaft. Accordingly, the display wire, which is difficult to have the connector structure, may be efficiently guided to the control unit and the noise may be minimized.

In addition, the wires may be guided to the rotational shaft of the sub-door without being exposed to the outside by the sub-cover connecting the wire entrance part with the hinge cover.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a cabinet;
   a control unit provided on the cabinet, the control unit being configured to control operation of the refrigerator;
   a main door configured to open or close the cabinet, the main door having a door opening;
   a main hinge plate configured to couple the main door to the cabinet and comprises a main hinge shaft, the main door being configured to rotate with respect to the main hinge shaft;
   a main hinge cover provided on the cabinet, the main hinge cover being configured to cover the main hinge plate;
   a sub-door located at a front of the refrigerator and configured to open or close the door opening of the main door;
   a transparent panel assembly provided at the sub-door, and configured to selectively visualize an inside of the door opening, the transparent panel assembly including a display;
   a sub-hinge plate configured to couple the sub-door to the main door and comprises a sub-hinge shaft, the sub-door being configured to rotate with respect to the sub-hinge shaft;
   a sub-hinge cover provided above the sub-hinge plate, the sub-hinge cover including a cover body configured to cover the sub-hinge plate and a shaft cover part provided above the sub-hinge shaft or the main hinge shaft; and
   a circuit board provided on the transparent panel assembly;
   a wire that is to electrically connect to the circuit board and to pass through an inside of the sub-hinge shaft,
   wherein the shaft cover part defines a through hole through which the wire is to pass, and
   wherein the wire is to pass inside the though hole of the shaft cover part and the main hinge cover and is connected to the control unit on the cabinet.

2. The refrigerator of claim 1, wherein the main hinge cover comprises a main cover body mounted on the cabinet and a main extending part provided above the shaft cover part, and
   wherein the wire is to pass inside the main extending part.

3. The refrigerator of claim 2, wherein the main cover body is formed with a cover opening, and
wherein the wire is to pass through the cover opening and is to connect to the control unit.

4. The refrigerator of claim 2, wherein the shaft cover part includes a sub-shaft cover part provided above the sub-hinge shaft, and
wherein the through hole comprises a first through hole defined at the sub-shaft cover part.

5. The refrigerator of claim 4, wherein the shaft cover part includes a main shaft cover part that is provided above the main hinge shaft, the main shaft cover part being interposed between the main hinge shaft and the main extending part, and
wherein the through hole comprises a second through hole defined at the main shaft cover part.

6. The refrigerator of claim 5, further comprising a cover connection part that is located between the main shaft cover part and the sub-shaft cover part, the cover connection being configured to connect the main shaft cover part to the sub-shaft cover part.

7. The refrigerator of claim 6, wherein the cover connection part comprises a connection hole.

8. The refrigerator of claim 7, wherein the cover connection part comprises:
a cut-out portion configured to receive the wire; and
a wire restriction part that is located at an inside of the cover connection part, d the wire restriction part to protrude from the inside of the cover connection part toward the sub-shaft cover part.

9. The refrigerator of claim 5, further comprising a connector,
wherein a width of the connector is greater than a diameter of the first through hole of the sub-shaft cover part and less than a diameter of the second through hole of the main shaft cover part.

10. The refrigerator of claim 9, wherein the wire is configured to be in the first through hole and pass through the cover connection part and through the second through hole.

11. The refrigerator of claim 5, wherein the wire is a first wire that passes the inside of the sub-door through the sub-hinge shaft, and
wherein the first wire comprises a display wire that is to be electrically connected to the display.

12. The refrigerator of claim 11, further comprising a second wire that passes through the main hinge shaft, and
wherein the first wire and the second wire connect to the control unit through the second through hole of the main shaft cover part.

13. The refrigerator of claim 1, wherein the sub-door comprises a hinge mounting part formed with a sub hinge hole to receive the sub-hinge shaft, and
wherein another wire provided inside of the sub-door passes through the hinge mounting part.

14. The refrigerator of claim 13, further comprising a sub-cover configured to receive at least a portion of the another wire,
wherein the sub-cover is provided on the cover body of the sub-hinge cover.

15. The refrigerator of claim 14, wherein the sub-cover is provided above the sub-hinge shaft.

16. The refrigerator of claim 14, wherein the sub-hinge shaft, the shaft cover part and the sub-cover are arranged along a direction parallel to the sub-hinge shaft, and are configured to communicate with each other.

17. The refrigerator of claim 5, wherein the main hinge cover is configured to cover the main shaft cover part, and
wherein the main hinge shaft, the main shaft cover part and the main hinge cover are arranged along a direction parallel to the main hinge shaft, and are configured to communicate with each other.

18. The refrigerator of claim 1, further comprising a connection cover on a top surface of the cabinet and configured to receive the wire,
wherein the connection cover is provided between the main hinge cover and the control unit.

19. The refrigerator of claim 1, wherein the transparent panel assembly is configured to change between transparent and non-transparent states to selectively allow an inside of the cabinet to be visible through the door opening.

20. The refrigerator of claim 1, wherein the sub-door defines a decoration opening formed at an upper end of the sub-door and configured to communicate with an upper portion of the transparent panel assembly, and
wherein the circuit board is located inside of the decoration opening.

* * * * *